United States Patent [19]
Kalt et al.

[11] Patent Number: 5,231,559
[45] Date of Patent: Jul. 27, 1993

[54] FULL COLOR LIGHT MODULATING CAPACITOR

[76] Inventors: Charles G. Kalt, P.O. Box 72, N. Adams; Mark S. Slater, 510 N. Houghton St., Clarksburg, both of Mass. 01247

[21] Appl. No.: 887,714
[22] Filed: May 22, 1992
[51] Int. Cl.5 .................... H01G 4/00; G02F 1/13
[52] U.S. Cl. ............................. 361/301; 340/719
[58] Field of Search ............... 361/301; 359/59; 340/719; 350/339 F, 345, 344

[56] References Cited

U.S. PATENT DOCUMENTS 4,793,691 12/1988 Enomoto et al. ............ 350/339 F
4,808,983 2/1989 Benjamin et al. ............... 340/719
5,041,824 8/1991 DiSanto et al. .................. 340/787
5,146,356 9/1992 Carlson ............................ 359/59

Primary Examiner—Donald A. Griffin
Attorney, Agent, or Firm—Handal & Morofsky

[57] ABSTRACT

A reflective full color light modulating capacitor having a fixed conductive electrode and an active metalized conductive electrode which is deformed from a relaxed state positioned away from the fixed electrode and a deformed state closer to the fixed electrode, whereby the degree to which the active electrode is deformed from its relaxed state varies in proportion to the magnitude of the voltage potential thereon, the metalization on the active conductive electrode being insulated from the fixed conductive electrode.

18 Claims, 28 Drawing Sheets

FIGURE 29

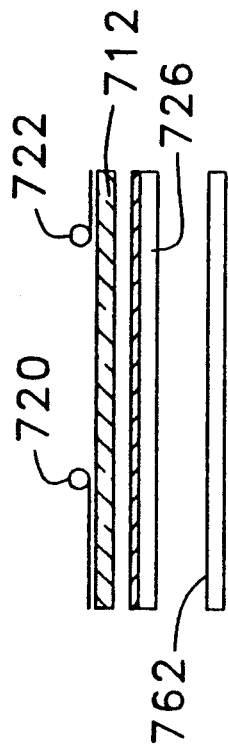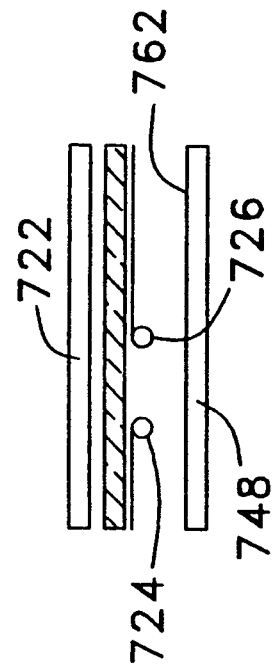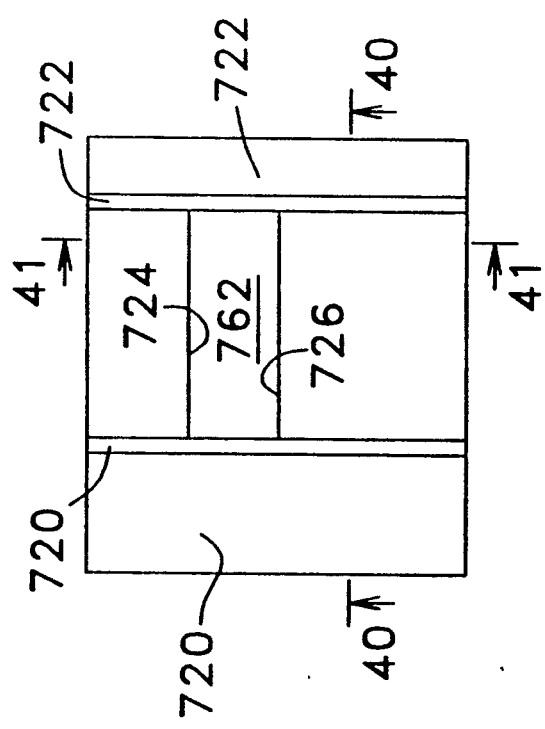

FULL COLOR LIGHT MODULATING CAPACITOR

TECHNICAL FIELD

The present invention relates to light modulating capacitors and is of particular interest in the provision of a reflective full color light modulating capacitor pixel.

BACKGROUND

Almost from the dawn of the industrial age, scientists were fascinated with the possibility of communication between remote points in coded, audio and visual formats. In France even as early as the late 1700's, elaborate semaphore systems enjoyed substantially widespread use. While such systems achieved their maximum readability during the light, and relied, to a large extent, on a subjective evaluation of a signal by the human eye in a sometimes noisy environment, the same represented a dynamic leap of progress over previously employed communications systems.

The invention of the telegraph by Morse in the early 1800's provided a means for rapid communication which effectively addressed virtually all the perceived limitations of semaphore communication. While the telegraph did require the installation of a telegraph wire hundreds and, ultimately, thousands of miles long, the telegraph insulated its users from dependence on good visibility conditions, fog, rain, atmospheric conditions and high levels of skylight due to natural and/or artificial causes.

Even before the invention of the telephone by Bell in 1876, it was recognized that electrical wires could be used to transmit video signals from a transmission point to a remote location. At least as early as the 1860's, French scientists proposed the possibility of scanning an object illuminated by candlelight using a Nipkow disk, reading the reflected light using a photoelectric device, and transmitting the signal over a wire to a remote point for viewing.

The weak point in that system (as well as in all modern video systems) was the display. Their proposed solution was to scan a sheet of paper mounted on a drum and impregnated with gunpowder with a high voltage ignition spark which burned in the image scanned by the Nipkow disk. While those familiar only with current state-of-the-art display technology might view such a technique as impractical, it was exactly this display technology which was employed by the great international news services during the first half of the 20th century to transmit photographs by wire.

Although this system had many inherent limitations, it had a number of virtues which no other widely employed display technology has succeeded in matching. For example, the system used very low power and produced very clear sharp images. Unlike liquid crystals, received pictures were visible over a wide angle of view. Unlike cathode ray tube images, images produced by this system enjoyed superb readability even under intense illumination. Still yet another advantage of this system was its extremely low cost.

Of course, such a system could only have limited application because of the exhaustion of the display member by a single frame of transmitted information.

While, during this early period in the history of video display technology, researchers working in the field may have entertained the possibility of a transient reflective mosaic as a video display, a transient controllable light source probably appeared to be a much greater possibility given the number of candidates which included, even at the turn of the century, the incandescent lamp, the neon lamp, and, of course, the cathode ray tube. The earliest employed "video" displays were signs, the most notable being so-called "neon" signs and incandescent bulb matrix arrays, such as those found on theater marquees.

However, with the rapid development of vacuum technology in the period surrounding World War I, the cathode ray tube became a practical solution, insofar as it relied upon plate, vacuum and grid technologies, all of which had been developed for other purposes.

Notwithstanding the limitations of the cathode ray tube, which included poor readability in sunlight, cumbersome size, excessively high voltage, the possibility of X-radiation, and so forth, researchers adopted what must now be considered a low-tech solution and proceeded instead to develop camera technology. Thus, even today, the cathode ray tube in a form substantially unchanged from its earliest embodiments remains the display standard, nearly a century after it was proposed.

When the time came to select a standard format for color television, a purely electronic display system was again selected. While some consideration was given to a rotating color filter wheel system developed by the Columbia Broadcasting System, the officials responsible for selection of a national color television standard were uncertain whether we would ever have the technology to reliably mechanically control a video display and thus opted in favor of what would also come to be recognized as a problematic approach, namely, the shadow mask cathode ray tube.

Nearly a half century later, however, the inherent limitations of the cathode ray tube have become painfully apparent. So-called "large screen" televisions can only be achieved by using small tubes and clumsy projection optics. Resulting pictures are of such low intensity that acceptable viewing can only be had in the dark. Stray light creates general deterioration in image resolution both by decreasing the signal-to-noise ratio in the display picture and reducing the chrominance content of the projected picture. The end result is a physically large, high voltage and high power system which produces a poor dim picture. Finally, there is a growing concern over CRT radiation output, above and beyond the X-band radiation problem which was substantially solved in the 1970's.

In an attempt to address these problems, manufacturers have turned to liquid crystal display technology. While such display technology may lend itself to relatively large flat displays which will operate at relatively low voltage, such displays are very expensive to manufacture and have poor visibility when viewed within the ideal angle of view and are substantially unreadable outside that angle of view. Likewise, color in LCD systems is of extremely poor quality.

A most promising candidate for the solution of the above problems is the LMC or light modulating capacitor. These devices come in a wide range of structures and include reflective as well as transmissive devices.

Generally, light modulating capacitors comprise at least one fixed electrode and an active electrode made of metalized plastic film. Modulation of light is achieved by physical displacement of the active electrode with respect to the fixed electrode, changing the reflective and/or transmission characteristics of the device. Actuation of the active electrode is accomplished by electrostatically attracting or repelling the variable electrode to a desired position. In the case of an active electrode made of metallized Mylar (a trademark of the E.I. duPont de Nemours and Company of Wilmington, Del.) brand polyester film, the electrode is extremely light, may be prestressed to increase the range of configuration possibilities, and requires extremely low power and low voltage to operate effectively and quickly.

When such a device was first proposed in the early 1970's, the active electrode generally had the shape of a flapper which was electrostatically driven from one position to another, typically in a two color grove having a V shaped cross-section, much like a pair of differently colored pages in a half-opened book. Because the flapper is highly reflective, when it is in a first position, it reflects the color of the inside of the groove on the side of the groove opposite that on which it is resting. Thus, when each side of the groove, is given a different color, the groove appears to be completely the color of the side opposite the active electrode. Because this could be a reflective device, it operated well in ambient light and with only the smallest consumption of electricity insofar as the light modulating capacitor would only pass enough current to charge its internal capacitance.

The possibility of a prestressed metallized Mylar electrode has been proposed which, in its relaxed state comprised a tightly coiled active electrode which would be electrostatically unrolled over a flat panel, thus changing the color of the flat panel to the color of the active electrode with the device configured as a light reflecting capacitor. I have also suggested the possibility of a light transmitting window where the device might be backlit and the active electrode used to control the transmission of light through the device.

Similarly, the possibility of a large matrix of light modulating capacitors being manufactured in a mass production operation and comprising a single multi-pixel module has been proposed. In this system, the pixel took the configuration of a V profile flapper-type device.

SUMMARY OF THE INVENTION

The invention, as claimed, is intended to provide a solution to the problem of achieving a full color display in a flat multi-pixel video display device. It does this while at the same time providing low manufacturing costs, low operating voltage, versatile pixel area and small panel thickness. At the same time, the display achieves full color brilliance and/or levels of darkness under a wide range of ambient lighting conditions including sunlight. Power consumption is also extremely economical and radiation as a health hazard is virtually eliminated. Finally display flicker is virtually eliminated, allowing narrow bandwidth transmissions in many applications.

In order for a video display to be effective, it must have the capability of going from a condition of reflecting all colors equally (white) to a condition of absorbing all color equally and to a substantially complete extent (black). It should also be capable of modulation in intensity for all values of light intensity between black and 100% reflection. This set of characteristics alone would provide the required performance for accurate definition of the luminance component of, for example, a broadcast color television signal. Chrominance control, however, requires similar control over, in the case of a light reflective display, the operation of three light absorbing mechanisms. The mechanisms could be not unlike that of a so-called four color printing system where small light panels of three primary printing colors and black are printed on a white sheet, with the black dots swelling to cover the entire surface when one desires to print the color black, and all of the dots shrinking to zero when one desires the surface to appear white. In between, the ratio of the areas of the ink spots in the three primary colors are adjusted to give the desired hue while the ratio of black and white to colored printed space is adjusted to provide the desired color saturation. The overall reflectivity of the system defines its luminance.

As has been shown in the case of so-called "color" LCD television displays, a wide range of compromises may be made while still achieving a display which conveys desired luminance and chrominance information. The challenge of a high quality display is to achieve a close approximation of the perfect luminance dynamic range extending between complete absorption and complete reflection and a peak chrominance exhibiting sufficient color saturation for a realistic depiction of a wide range of subjects. In principle, it has also been discovered, in accordance with the present invention, that a color neutral black is of primary importance, that bright whites are of importance and that under many circumstances, poor color saturation range may not produce any detectably bad result.

In accordance with one embodiment of the invention, means are provided for almost perfect control of luminance tint and saturation in a single pixel. A matrix of the inventive devices is thus capable of appearing completely reflective, completely absorptive, and of having any degree of reflection therebetween with a substantially infinitely adjustable chrominance characteristic, both as regards to tint and color saturation.

BRIEF DESCRIPTION OF THE DRAWINGS

One way of carrying out the invention is described in detail below with reference to drawings in which dimensions and proportions have been exaggerated for purposes of clarity of illustration, and in which.

Figure 26:
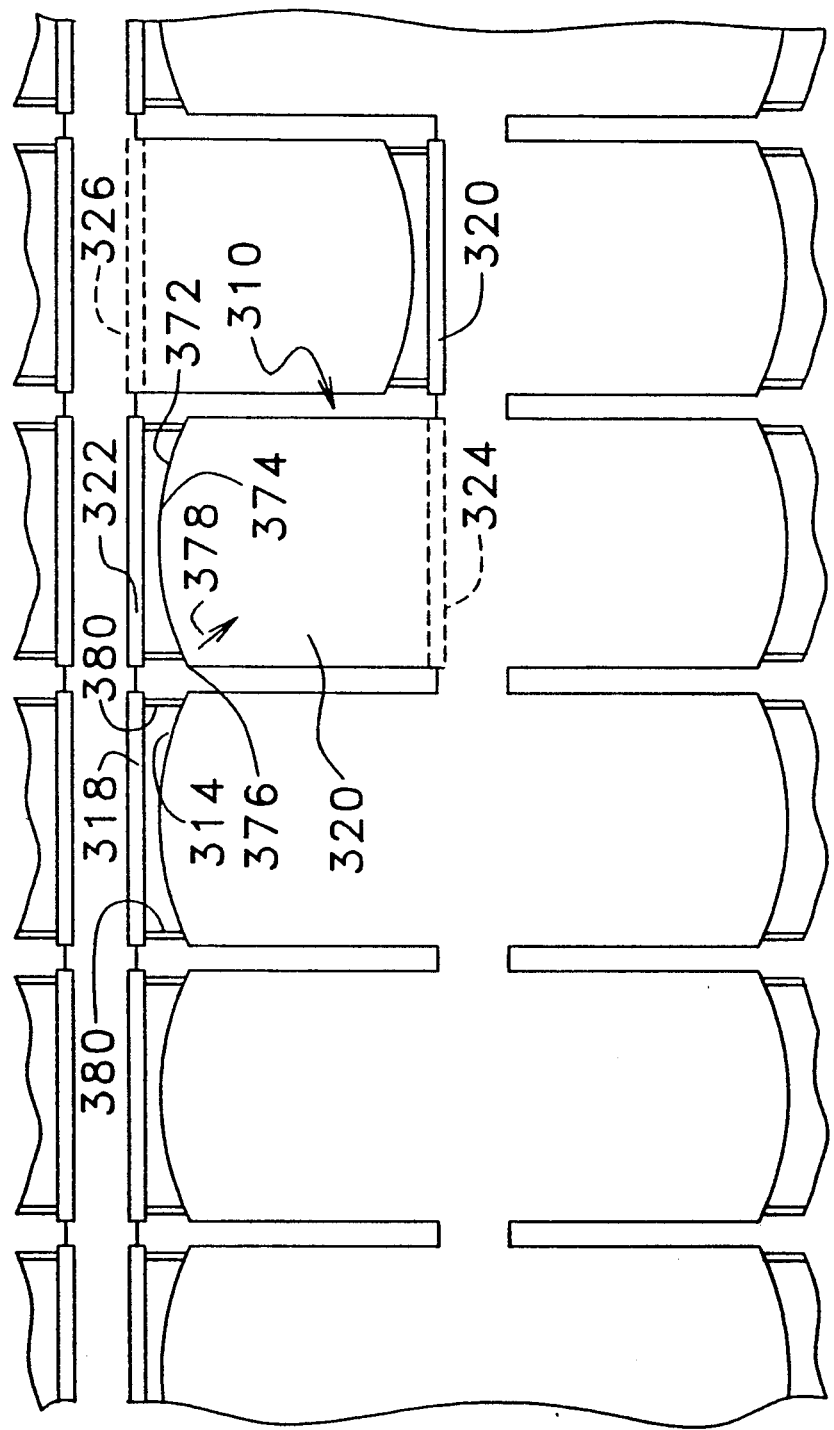
Figure 27:
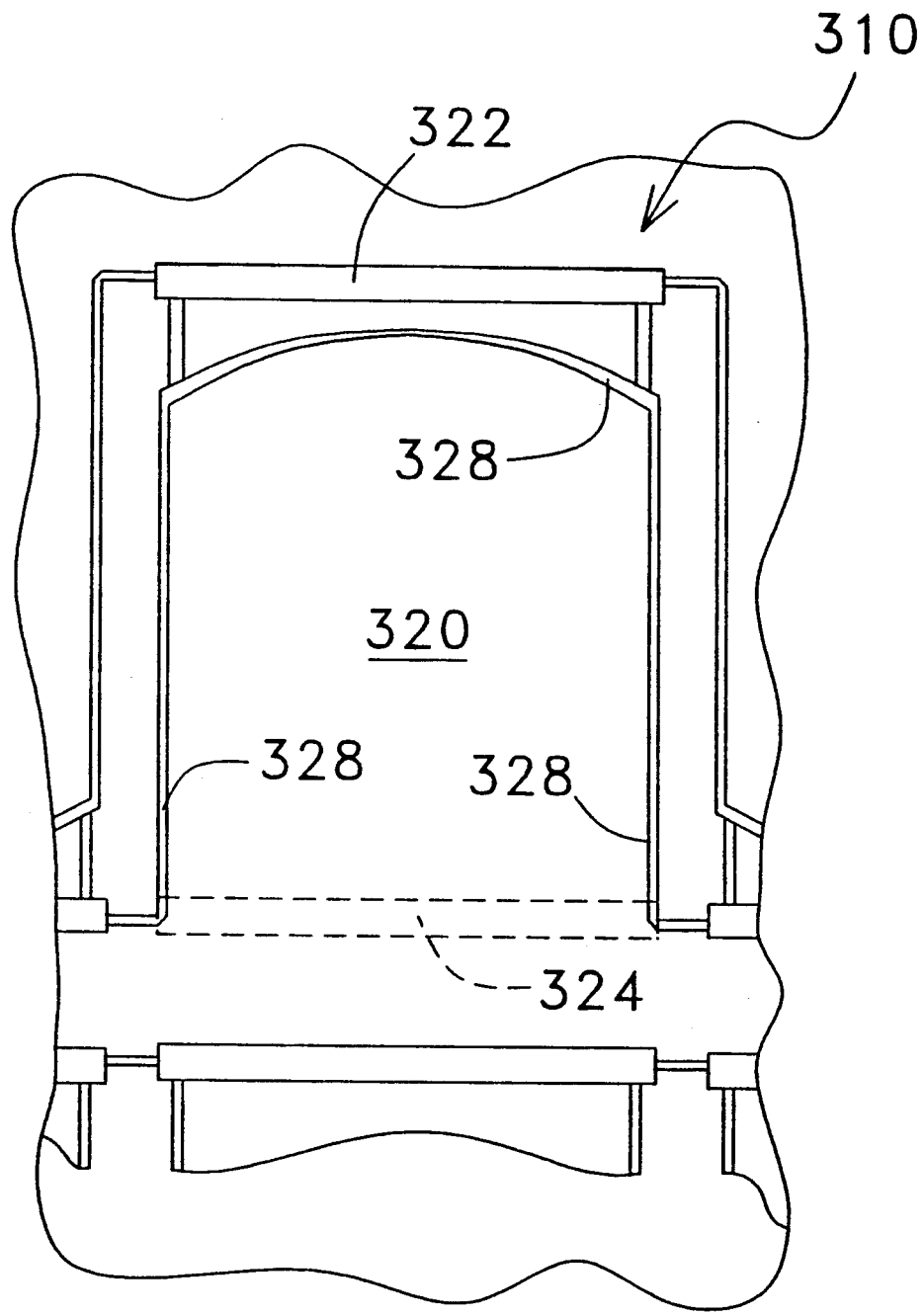
Figure 28:
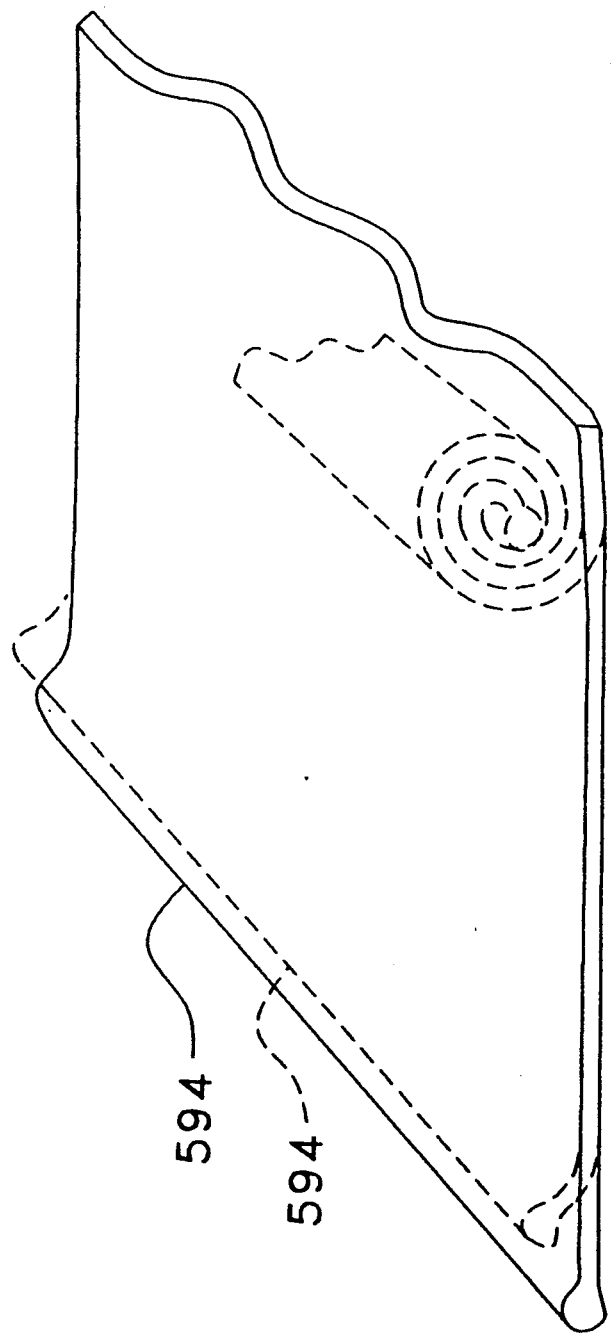

FIG. 26 illustrates a possible matrix construction of inventive pixels;

FIG. 27 is a detail of a pixel illustrated in FIG. 26;

FIG. 28 represents a method of preventing uneven rerolling of an electrode through the use of a ribbed or stiffened edge 594.

Figure 29:
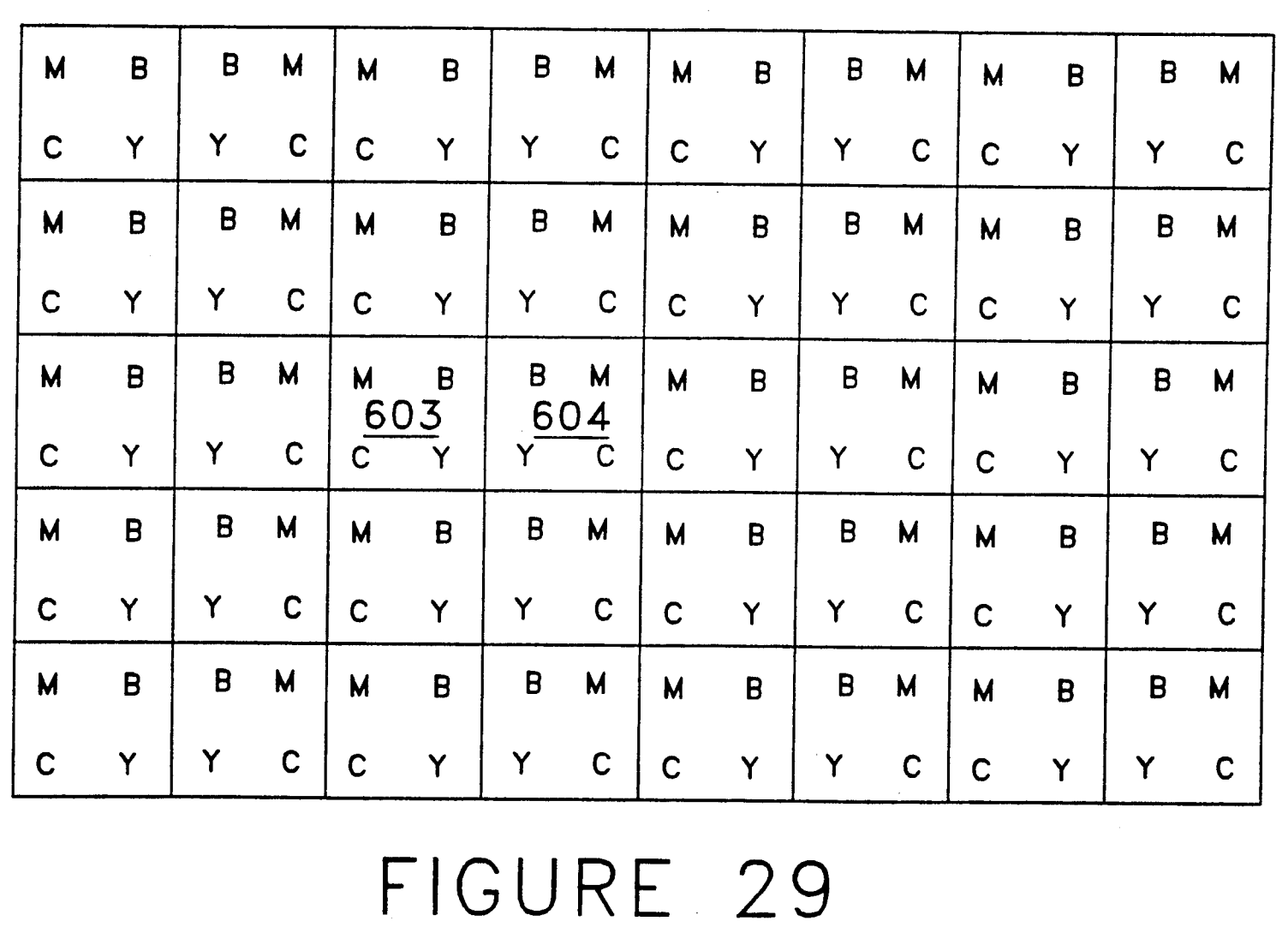
Figure 30:
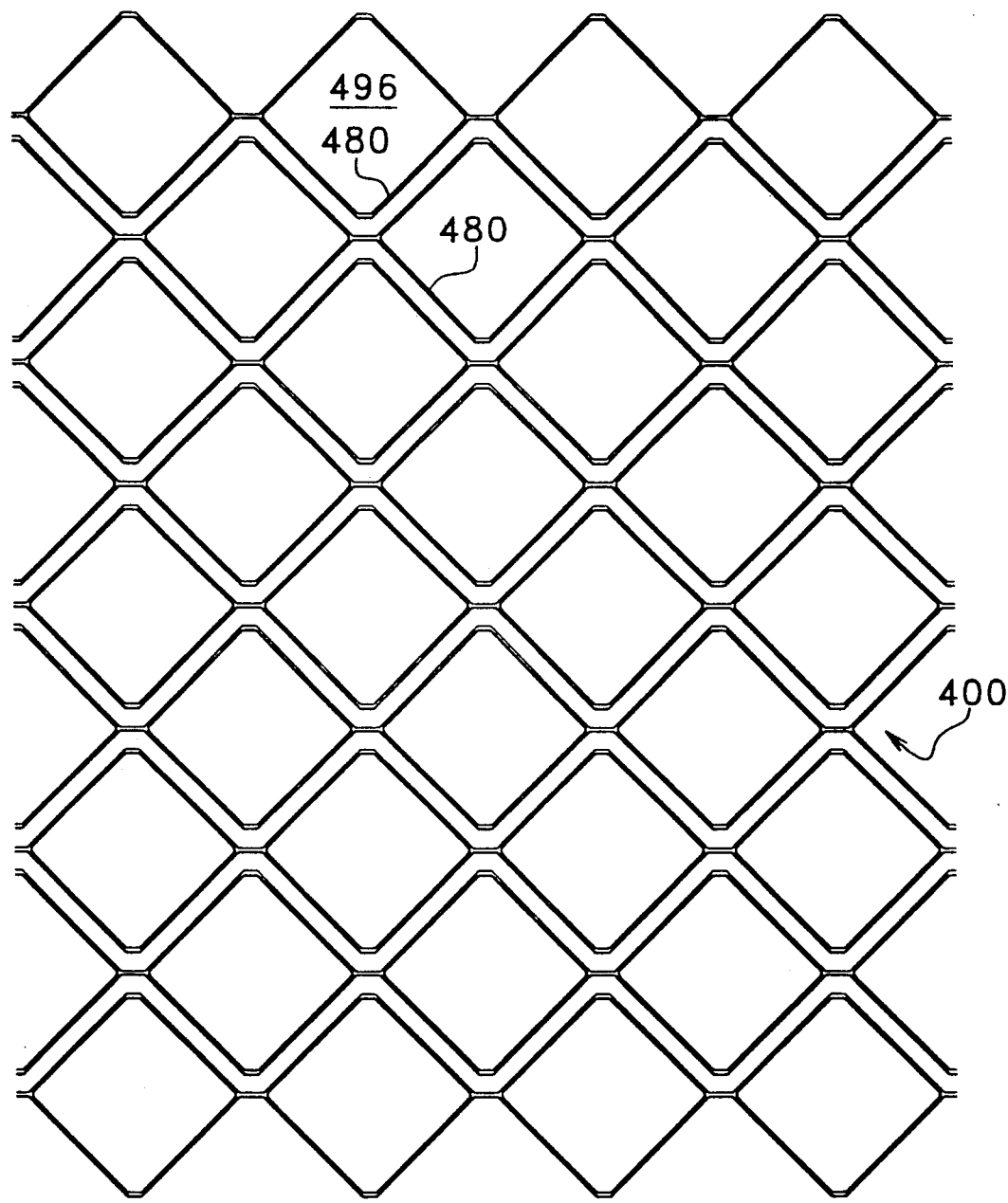
Figure 31:
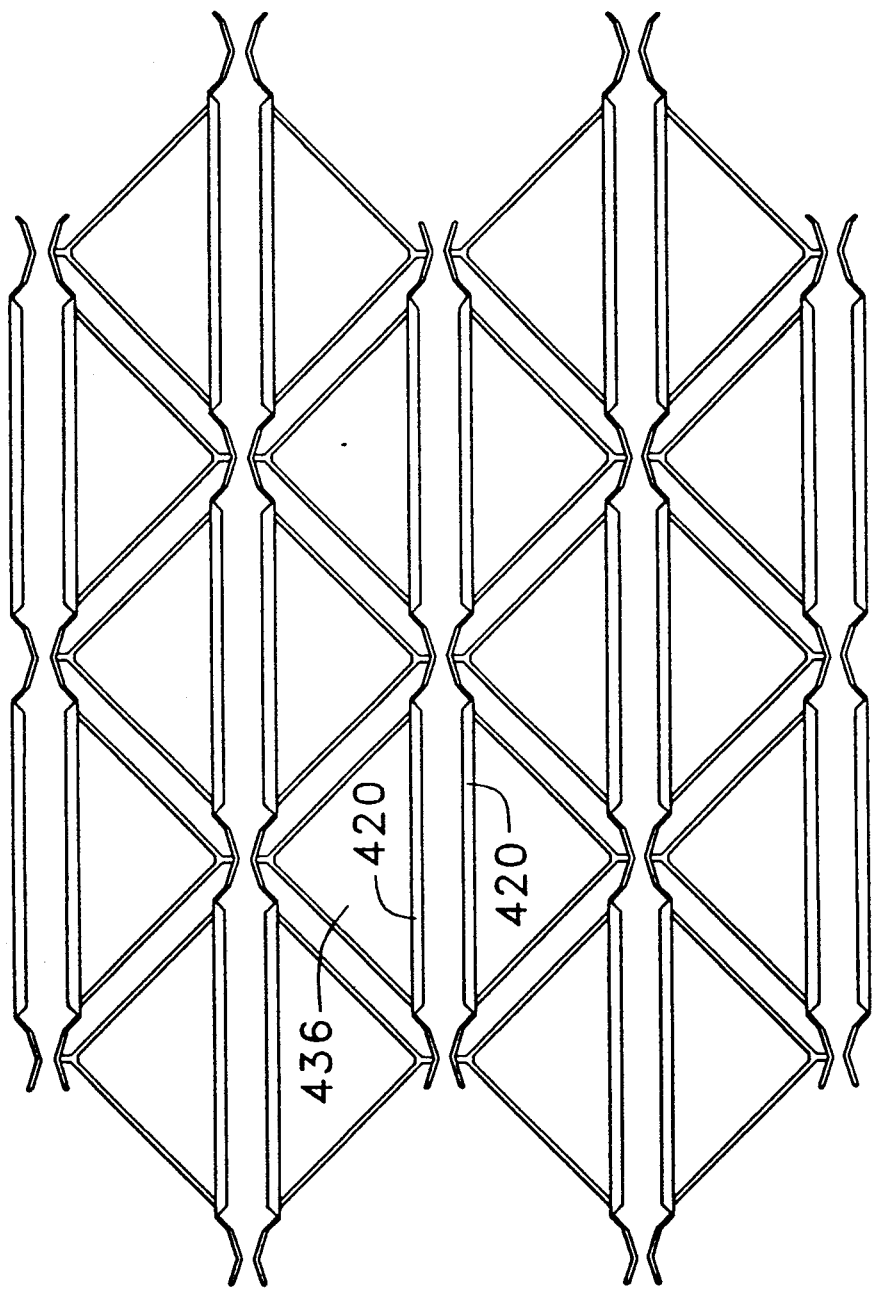
Figure 32:
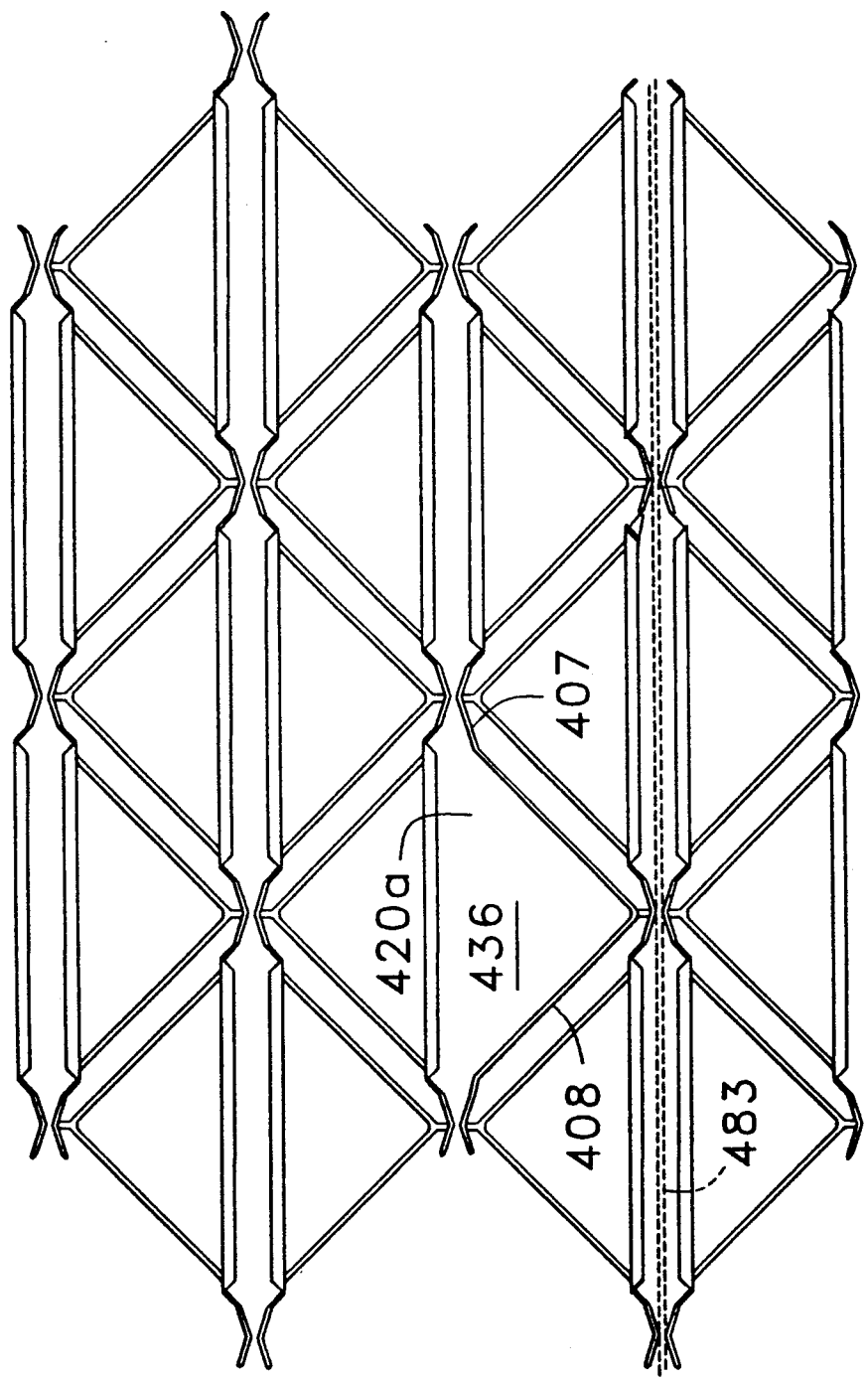
Figure 33:
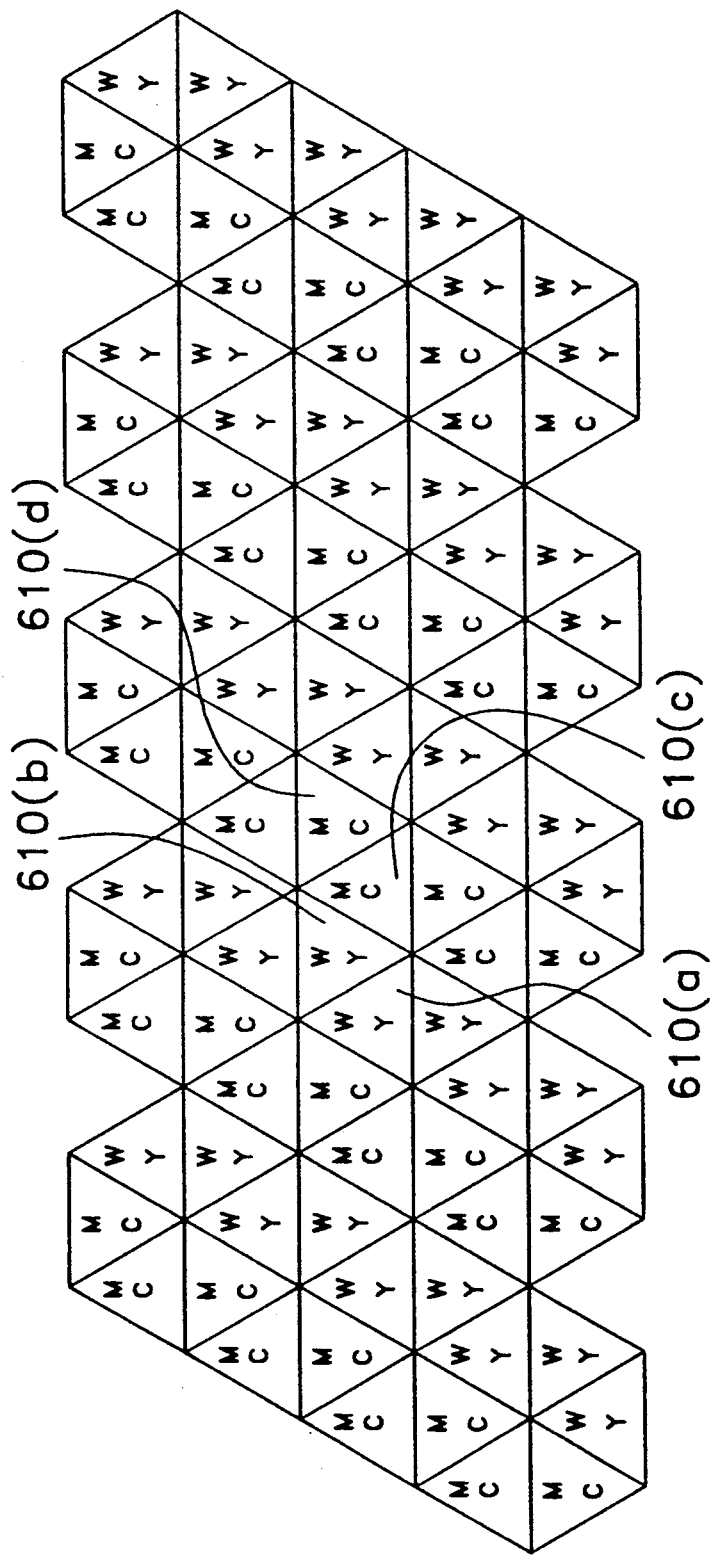
Figure 34:
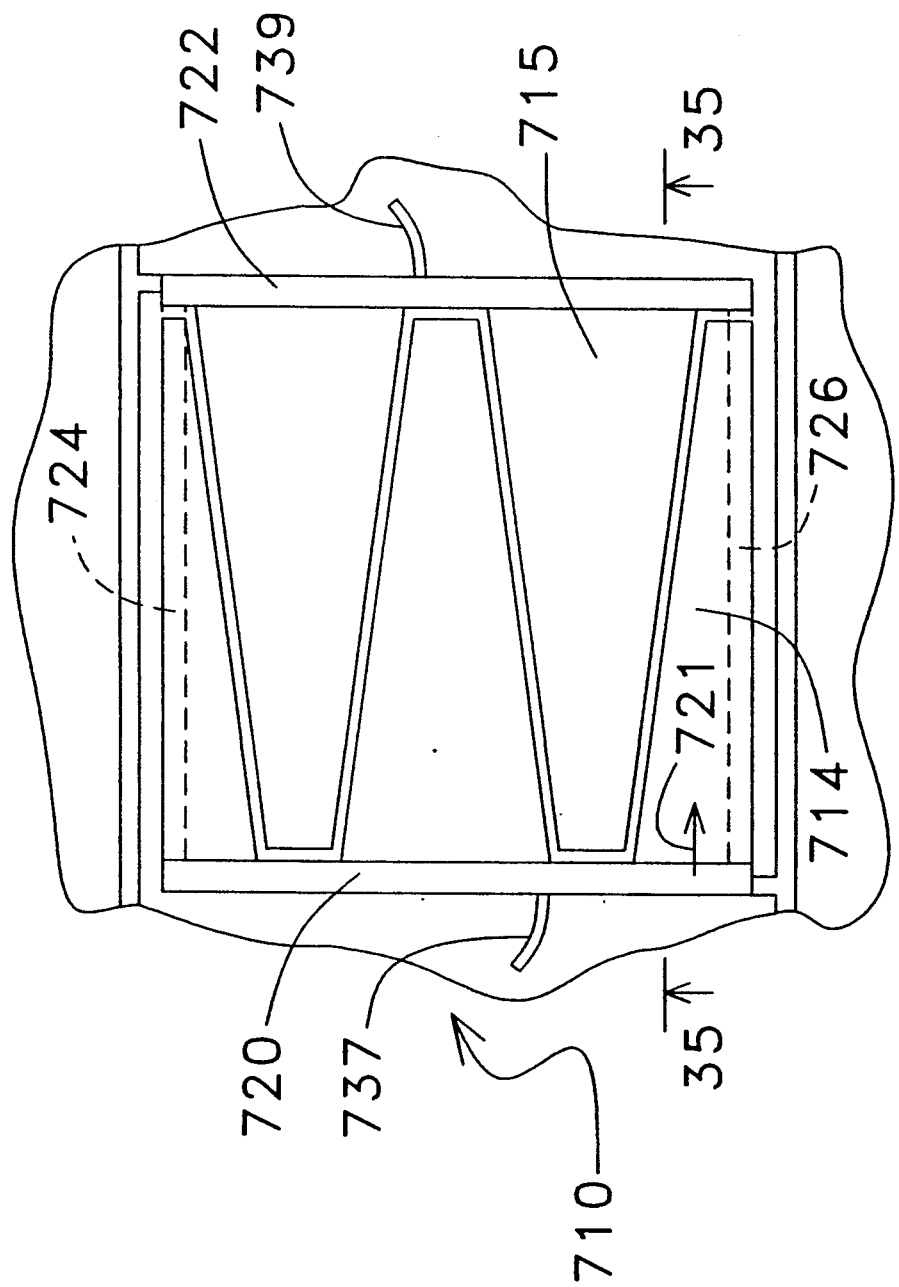
Figure 35:
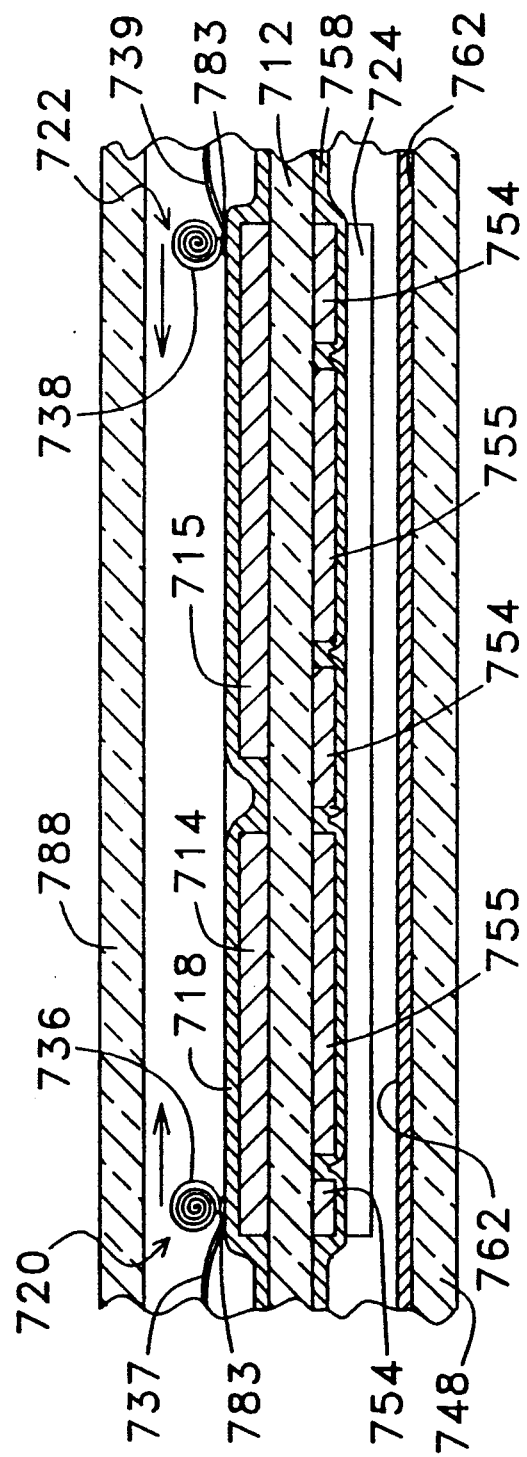
Figure 36:
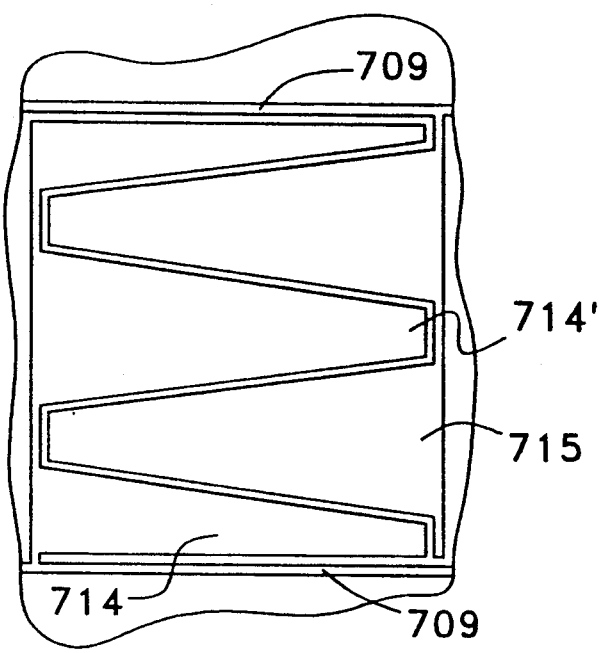
Figure 37:
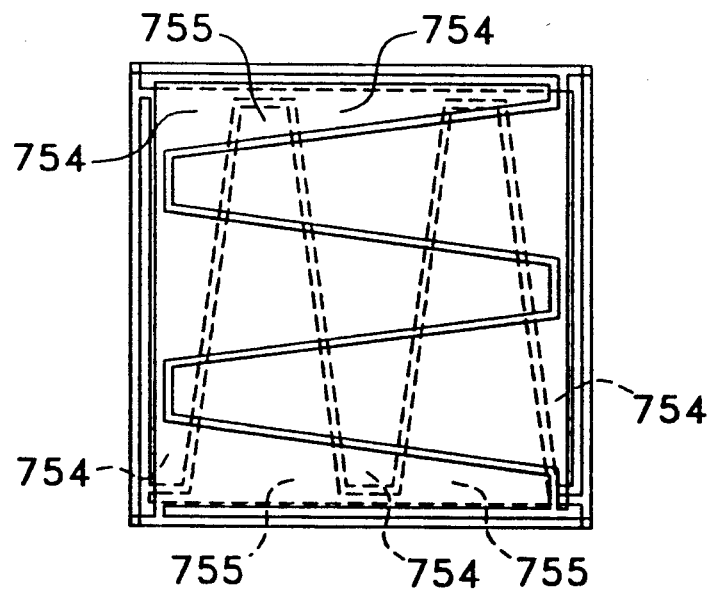
Figure 38:
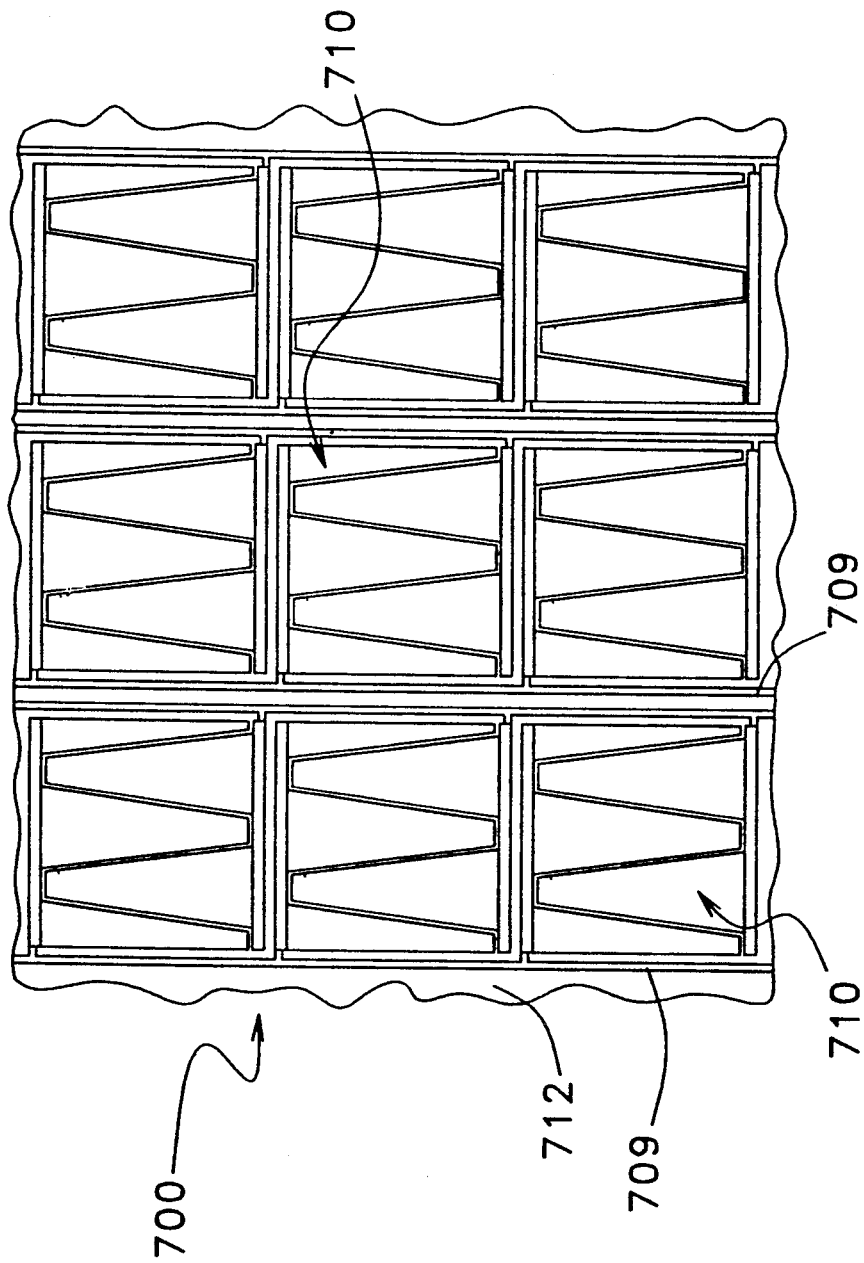

FIG. 29 is a diagram showing color assignments to electrodes in a matrix constructed in accordance with the present invention;

FIG. 30 is a diagram illustrating the configuration of fixed electrodes in a matrix constructed in accordance with the present invention and incorporating triangular active electrodes;

FIG. 31 is a view of a matrix display constructed in accordance with the present invention and incorporating triangle electrodes with all electrodes shown in the open rolled up position;

FIG. 32 is a view similar to FIG. 31 showing one of the electrodes unrolled;

FIG. 33 is a diagram illustrating color assignments in the matrix illustrated in FIG. 32;

FIG. 34 is a view of another pixel constructed in accordance with the present invention and useful in an analog matrix of pixels;

FIG. 35 is a view along lines 35—35 of FIG. 34 illustrating the construction of the inventive pixel;

FIG. 36 is a view illustrating the configuration of the fixed electrodes and bussing conductors of the embodiment of FIGS. 34-35;

FIG. 37 is a view similar to FIG. 36 illustrating the fixed electrode and bussing conductor structure on the underside of the substrate;

FIG. 38 is a view of a matrix of pixels constructed in accordance with the present invention and incorporating a device such as that illustrated in FIGS. 34-37;

FIG. 39 illustrates the pixel of FIG. 34 with different amounts of the five color components of the pixel being presented for viewing;

FIG. 40 is a diagrammatic view along lines 40—40 of FIG. 39; an

FIG. 41 is a view along lines 41—41 of FIG. 39 and diagrammatically illustrating the relationship of the various electrodes.

BEST MODE FOR CARRYING OUT THE INVENTION

Referring to Figure a four color reflective light modulating capacitor 10, which may function as a pixel in an array forming a highway sign or the like, is illustrated. Light modulating capacitor 10 may be of the reflective type and is built on a substrate 12. Substrate 12 supports a layer of transparent material 14 which may be made of any known transparent conductive material, such as indium tin oxide (ITO) or any other suitable material. ITO is deposited in extremely thin layers (1000 to 10,000 ohms per square) in order to minimize the impact of heat during the deposition process on the integrity of the substrate.

Figure 1:
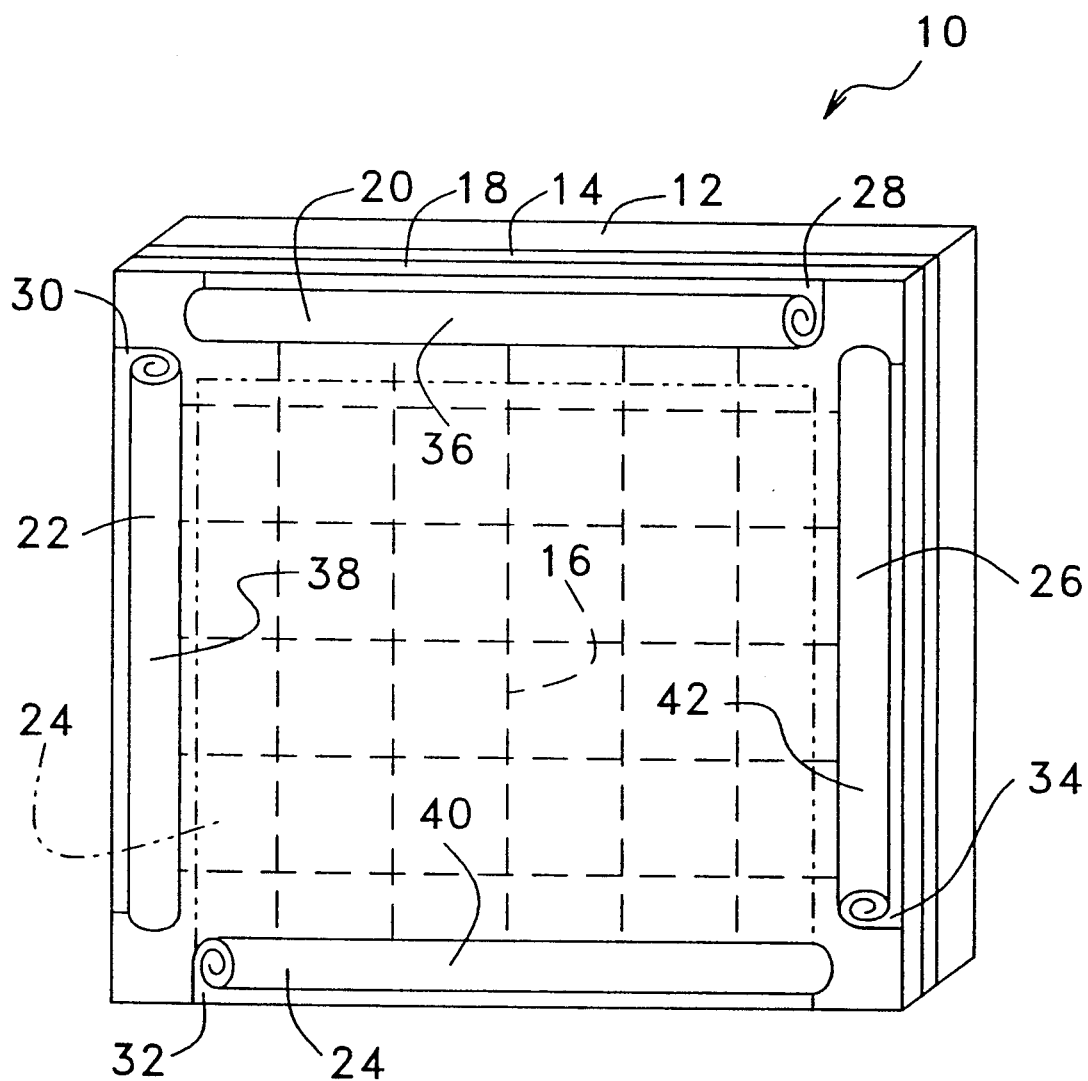
FIG. 1 is a four active electrode light modulating capacitor constructed in accordance with the present invention illustrated in diagrammatic form.

In the event that extremely large areas are required and the resistance of the layer of transparent conductive material 14 is large, the material may be maintained substantially transparent but more highly conductive over large areas by deposition of an extremely fine metal grid 16 over material 14, as illustrated in FIG. 1. The number of conductors per inch in grid 16 would be a function of the area and conductivity of the transparent conductive material 14. The thickness and width of the conductors in grid 16 are a function of the length and width of the pixel and, in an array, the length and width of the array. However, present information suggests strongly that such grids are not necessary for presently envisioned applications.

Material 14 is, in turn, covered by a dielectric layer 18. The structure is completed by four facing active light modulating capacitor electrodes 20, 22, 24 and 26. Active electrodes 20-26 are made of a plastic material having a thickness of about 2.5 microns and covered with an extremely thin layer of conductive material (typically aluminum having a thickness on the order of about 2.5 millionths of a centimeter. Thus, one side of the flat planar material of which electrodes 20-26 are made is plastic and the other side is a conductor. In the embodiment illustrated in FIG. 1, the plastic sides 28-34 are exposed toward the front of the device while the metal sides 36-42 of electrodes 20-26 lie on the underside of the electrodes when the electrodes are completely uncoiled from the position illustrated in FIG. 1. Thus metal sides 36-42 appear as indicated in FIG. 1.

As can be seen from FIG. 1, if any one of the electrodes, such as electrode 24, is unfurled, as is illustrated in phantom lines in FIG. 1, the plastic side (in the case of electrode 24, plastic side 32) is exposed to view. In accordance with the present invention the plastic sides of the electrodes, such as plastic side 32, are covered with a very thin layer of four different reflective colored materials 44. This gives the light modulating capacitor the possibility of four different display colors.

Figure 2:
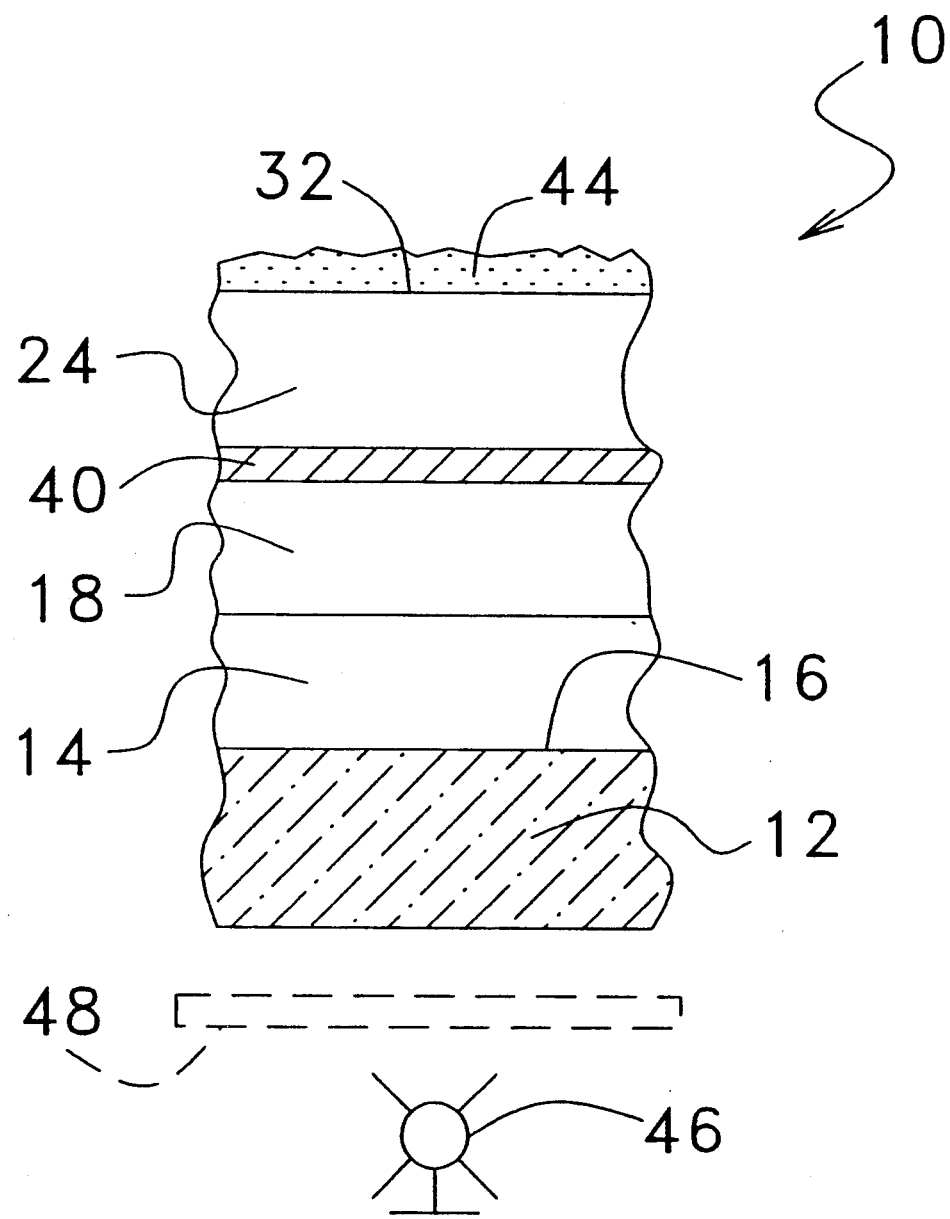
FIG. 2 is a cross-sectional representation of the light modulating capacitor of FIG. 1 illustrating the various operative members.

FIG. 2 is a view in cross-section of the device of FIG. 1 with electrode 24 unfurled, illustrating the multi-layer construction of the device more clearly. Because substrate 12 and material 14 are transparent, LMC 10 may be backlit by a source of illumination 46. Alternatively, a background color element 48 could be added in order to show a fifth color.

During operation, if it is desired to unfurl any of the active electrodes, the same may be readily achieved. The active electrodes are pre-stressed to form a tightly coiled roll, as illustrated in FIG. 1. Thus, in the absence of any external force, the active electrodes form the illustrated small recoiled coiled-up member. However, in the event that one desires to unfurl one of these coiled up members, it is merely necessary to apply a voltage difference between the metalized layer on the particular active electrode and the transparent conductive substrate which it overlies when unfurled or unrolled. The result will be attraction causing the active member to unroll to a substantially flat shape in which configuration it is at its maximum capacitance.

For example, it is also possible that by varying the shape of the overlapping areas of metalized layer on the active electrode and the fixed electrode variable amounts of unfurling may be achieved. More particularly, by varying the length of the edge of the overlapping area of the active electrode as the electrode unrolls, the total amount of force needed to keep the electrode unrolled varies, thus providing for partial control of the electrode. The operating characteristic of voltage versus active electrode area unrolled may be changed to achieve a desired linear or nonlinear characteristic which may be particularly useful depending upon the application involved, as will be described in detail below.

Figure 3:
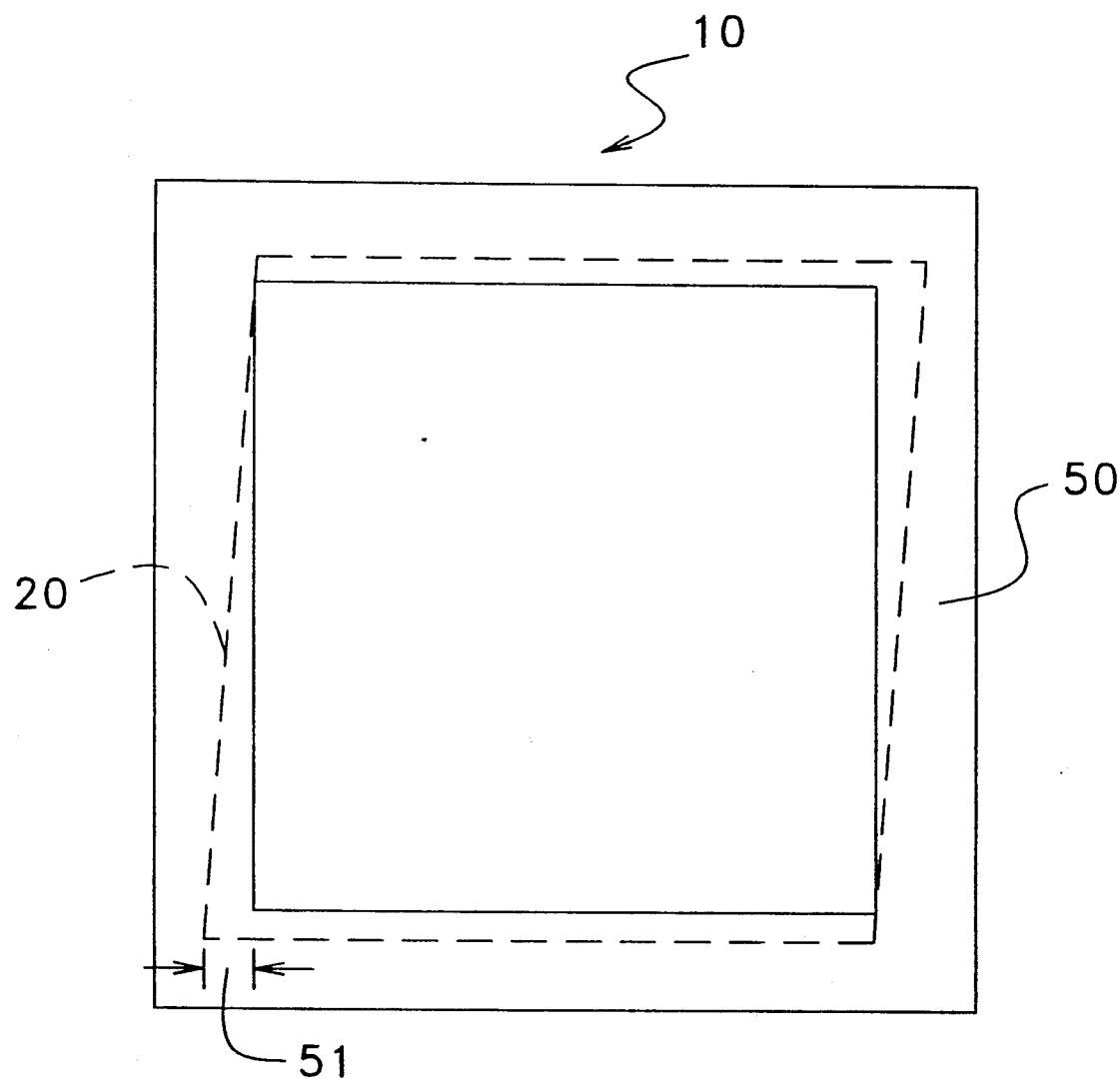
FIG. 3 illustrates a defect which may be caused by irregularities in the manufacturing process or asymmetrical forces present during operation of the inventive light modulating capacitor.

Due to normal manufacturing tolerances, pixel size and configuration may vary. In addition stray forces may cause additional variations in electrode shape. Referring to FIG. 3, in accordance with the present invention, any variation 51 in size and configuration of the active electrodes is compensated for by a mask 50 which extends around the periphery of a pixel formed by a light modulating capacitor 10.

Figure 4:
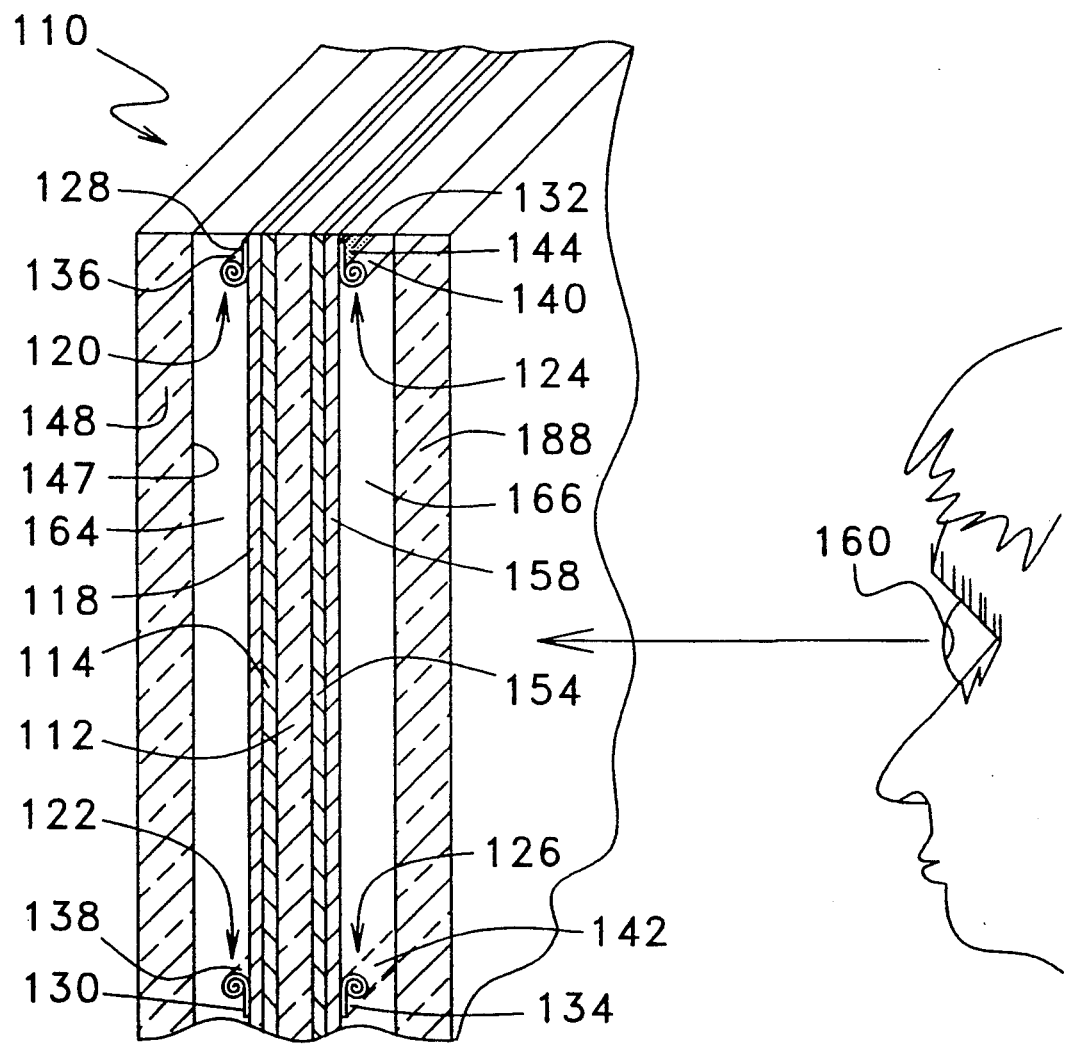
FIG. 4 is a perspective view partially in cross-section illustrating an alternative embodiment of a pixel incorporating four electrodes and a background color and constructed in accordance with the present invention and in which pulse time modulation will provide shades of color.

An alternative embodiment of the invention is illustrated in FIG. 4. Generally, similar parts or parts performing analogous, corresponding or identical functions to those of the FIGS. 1-3 embodiment are numbered herein with numbers which differ from those of the earlier embodiment by multiples of one hundred.

Light modulating capacitor 110 is of the reflective type and because of the configuration of the active electrodes offers the possibility of complete control over luminance over a range of reflectivity from black to white, complete variation of the chrominance of the capacitor including both hue and color saturation. Light modulating capacitor 110 is built on a substrate 112 which may be made of glass, plastic or any suitable transparent material. A thin layer of rigid Mylar plastic is preferred as it is strong in thin layers. Thin layers are desirable in order to minimize parallax. Substrate 112 supports a layer of transparent material 114 which may be made of any known transparent conductive material, such as indium tin oxide (ITO) or any other suitable material and having a thickness of about 300 Angstroms. In the event that extremely large areas and quick response times are required and the resistance of the layer of transparent conductive material 114 is large, the material may be maintained substantially transparent but more highly conductive over large areas by material 114 deposited underneath an extremely fine printed circuit metal grid similar to grid 16, illustrated in phantom lines in FIG. 1. However, it is likely in most applications to be easier to raise the conductivity of the ITO layer.

Material 114 is, in turn, covered by a dielectric layer 118. The back side of the structure includes two active light modulating capacitor electrodes 120 and 122. Active electrodes 120 and 122 are made of a plastic material covered with an extremely thin layer of conductive material such as aluminized polyester plastic having a thickness of 2.5 microns. Thus, one side of the flat planar material of which electrodes 120 and 122 are made is plastic and the other side is a conductor. In the embodiment illustrated in FIG. 4, the plastic sides 128 and 130 are exposed toward the rear of the device while the metal sides 136 and 138 lie on the front of the electrodes when the electrodes are completely uncoiled from the position illustrated in FIG. 4. Thus, metal sides 136 and 138 appear as indicated in FIG. 4.

Figure 5:
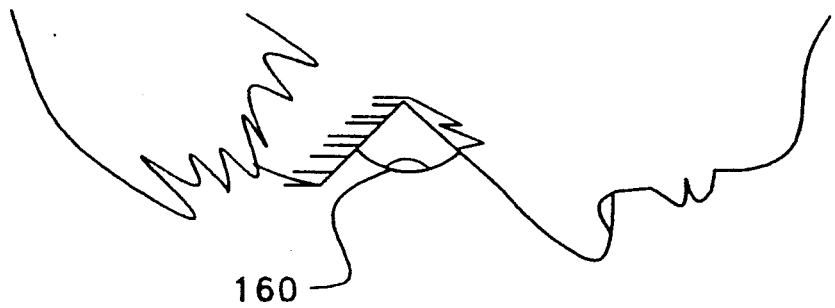
FIG. 5 is a cross-sectional view of the embodiment of FIG. 4.
Figure 5:
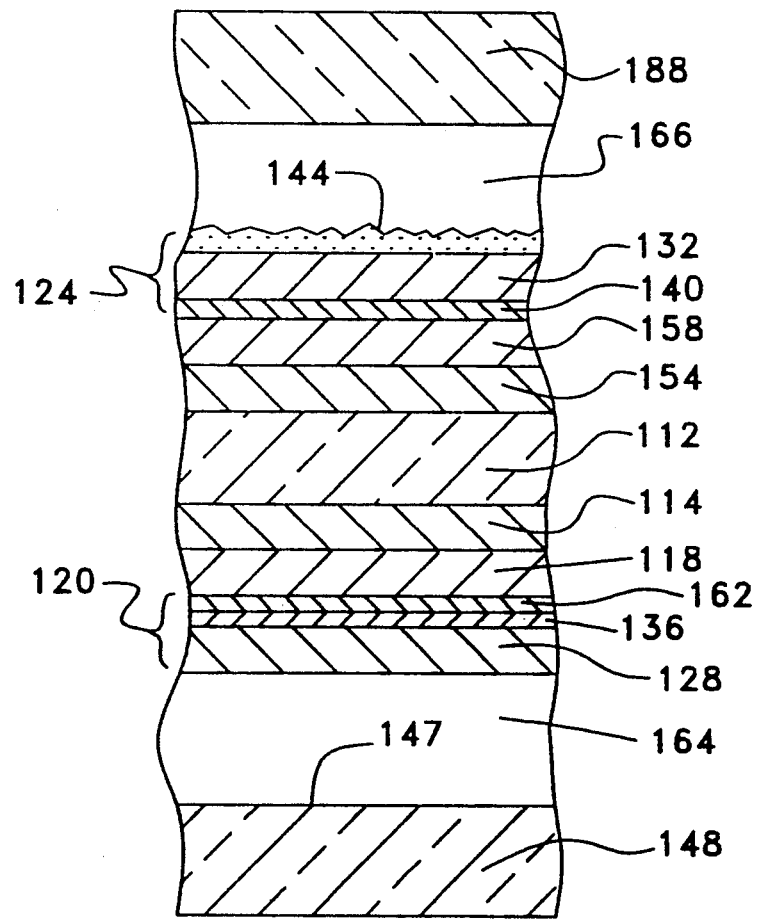

As can be seen from FIG. 4, if any one of the electrodes, such as electrode 124, is unfurled, as is illustrated in phantom lines in FIG. 4, the plastic side (in the case of electrode 124, plastic side 132) is exposed to view. In accordance with the present invention the plastic sides of the electrodes, such as plastic side 132, are covered with a thin layer of reflective colored material 144 which may be made of pigment and a binder. The layer must be thin to avoid damping the operation of the electrode. See FIG. 5 where two electrodes are shown unfurled and in cross-section for purposes of illustration.

Substrate 112 also supports a layer of transparent material 154, which may be composed of any known transparent conductive material, such as indium tin oxide or any other suitable material. In the event that extremely large areas are required and the resistance of the layer of transparent conductive material 154 is large, the material may also be maintained substantially transparent but more highly conductive over large areas by deposition of material 154 under an extremely fine metal grid similar to grid 16, illustrated in phantom lines in FIG. 1.

Material 154 is, in turn, covered by a dielectric layer 158. The front side of the structure includes two active light modulating capacitor electrodes 124 and 126. Active electrodes 124 and 126 are made of a plastic material covered with an extremely thin layer of conductive material. In the embodiment illustrated in FIG. 4, the plastic sides 132 and 134 are exposed toward the front of the device while the metal sides 140 and 142 lie on the rear of the electrodes when the electrodes are completely uncoiled from the position illustrated in FIG. 1. Thus, metal sides 140 and 142 appear as indicated in FIG. 4. The structure is covered in the front by a covering face plate 188.

The fixed electrode formed by conductive material 114 may have substantially the same size and shape as its respective active electrodes. As in the earlier embodiment, in the event that one desires to unfurl one of these coiled up members, it is merely necessary to apply a voltage difference between the metalized layer on the particular active electrode and the transparent conductive substrate which it overlies when unfurled or unrolled. The result will be attraction causing the active member to unroll completely.

A background color is applied to the surface 147 of rear planar housing element 148. Because the metal layer of active electrodes 120 and 122 faces a viewer 160, a conductive color layer 162 must be adhered to the metal. See FIG. 5. Such layer may be a layer of oxidized deposited titanium, $TiO_2$ in a binder such as a very thin layer of acrylic lacquer, extremely fine carbon black, or the like. However, if a non-conductive material is used, it must be very thin so that electrical charges easily migrate to the metal layer it rests on, thus preventing the buildup of triboelectric charges.

During operation, if it is desired to unfurl any of the active electrodes, the same may be readily achieved. The active electrodes are preformed into a tightly coiled roll, as in the embodiment of FIG. 1. Thus, in the absence of any external force, the active electrodes form the illustrated small coiled up member.

Application of a voltage difference between the metalized layer on the particular active electrode and the transparent conductive substrate which it overlies causes it to be unrolled in the spaces 164 and 166 provided for that purpose. Electronic controls should be used to prevent mechanical collisions between electrodes which roll along the same fixed electrode. This also applies to the other embodiments disclosed herein.

Referring to FIGS. 6-23, the substantially complete dynamic range that variable control of the inventive light modulating capacitor can provide over a selectable wide range of luminance, hue and color saturation including substantially complete control over luminance, tint and color saturation is illustrated. The only limitations on this range are the thin black mask 150 which has the result of darkening the display, and the perfection with which the materials can be made to faithfully reflect 1) either 100% of the light, or 2) to absorb 100% of the light, or 3) to faithfully reproduce the cyan, yellow and magenta colors required for full color reflective display capabilities.

In this respect, the inventive system, when incorporated in a matrix of light modulating capacitors, from a color reproduction theory standpoint resembles standard so-called "four color printing" except for the black top surface 168 of mask 150. While the width of mask 150 is greatly exaggerated for purposes of illustration, in a real device, mask 150 is made as small as possible and would likely have an area in the range of about 2-20% of the area of the display. Thus, it would reduce luminance only by about 2-20%, an effect which at the low end would be virtually undetectable. In some cases it may be desirable to use no mask at all.

Figure 7:
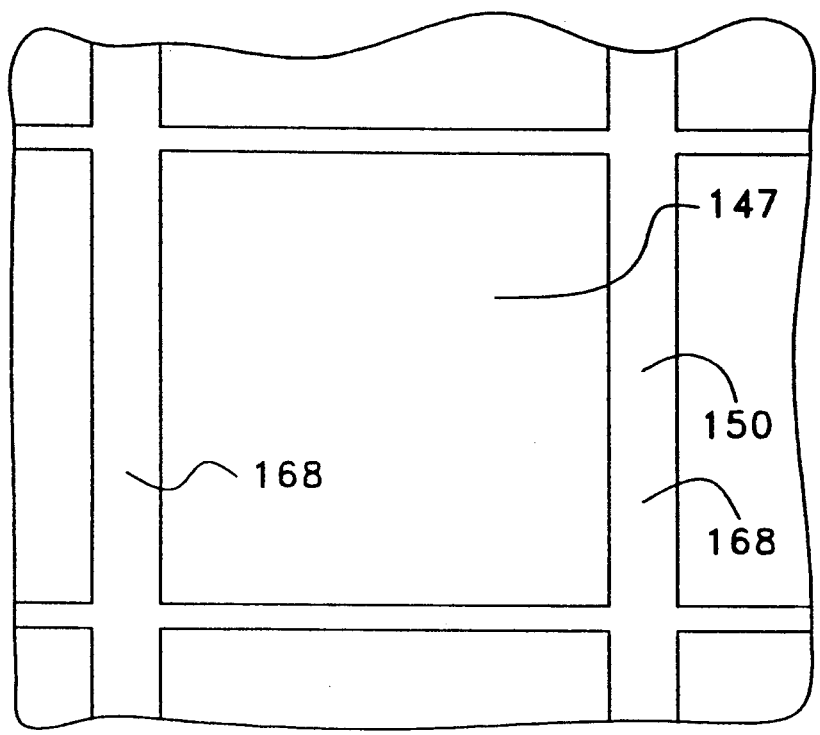
FIGS. 6–25 illustrate the full color capability of a device such as that illustrated in FIG. 4 when provided with a fixed electrode or other mechanism for controlling in analog fashion the amount of unfurling of the variable electrode with odd numbered FIGS. 7–25 representing the views along odd numbered lines 7—7 through 25—25 in plan in cross-sectional views illustrated in even numbered FIGS. 6-24, respectively.
Figure 6:
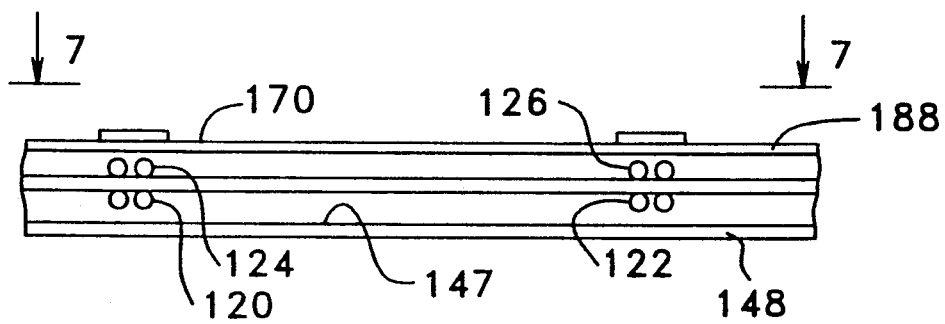

Referring to FIGS. 6 and 7, the principal components of a substantially black appearing pixel in the inventive system is illustrated. In particular, because all active electrodes 120-126 are in their relaxed unactivated states, a viewer looking at the pixel will see only the black coating on surface 147 of rear housing member 148. In connection with this, it is noted that the coatings on substrate 112 are desirably selected for the minimization of polychromatic reflections from the display. Likewise, it may be desirable to coat the outside surface 170 of the housing formed by rear element 148 and front housing member 188, to minimize reflections from these surfaces.

Figure 9:
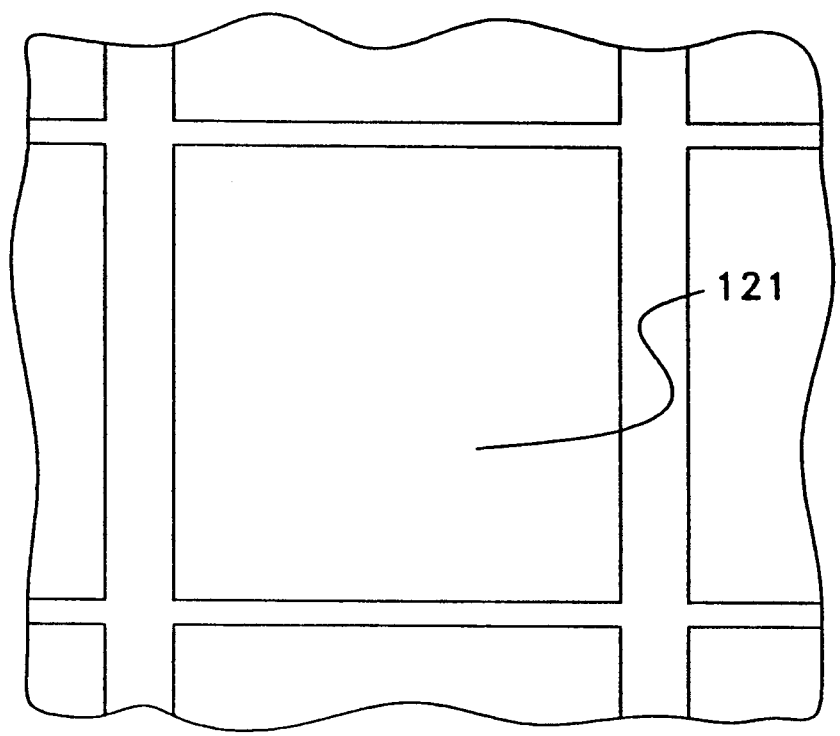
Figure 8:
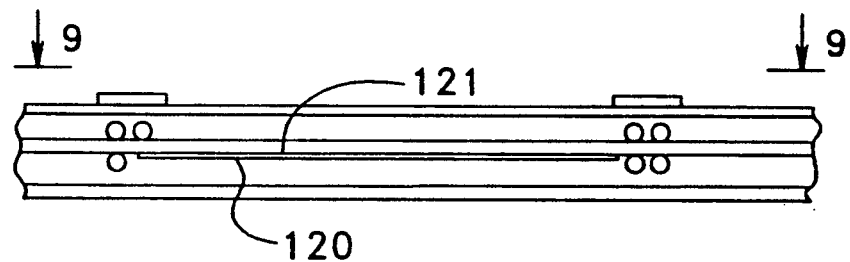

If an all yellow pixel is desired, the inventive system is put in the configuration illustrated in FIGS. 8 and 9. Here only electrode 120 has been unfurled exposing its surface 121 which is colored yellow to view, resulting in the display of yellow surface 121 to a viewer as illustrated in FIG. 9.

Figure 11:
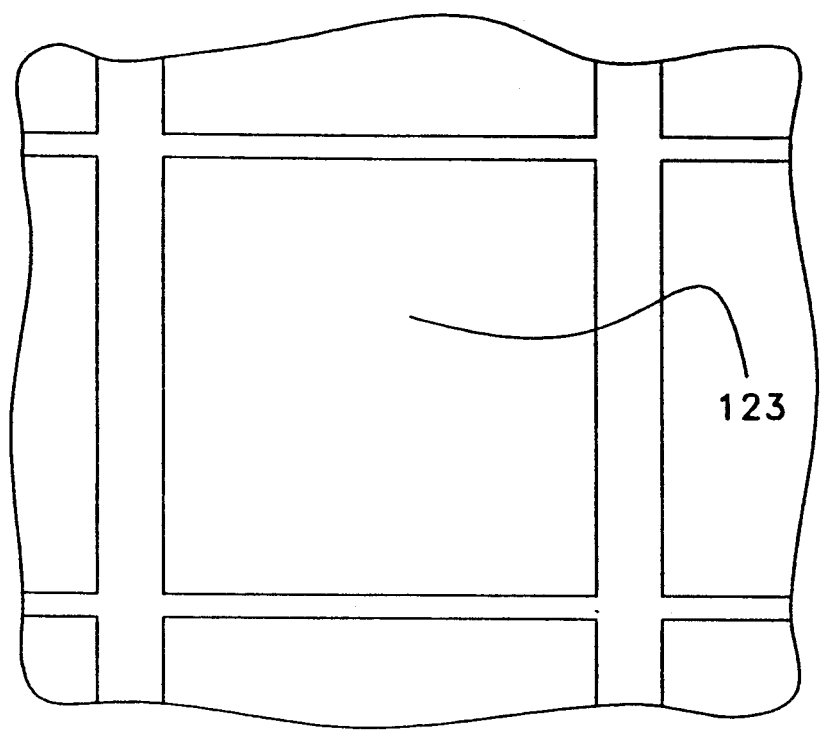
Figure 10:
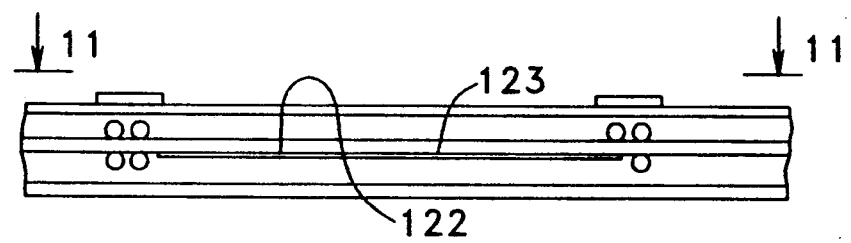

When it is desired to have a completely cyan display, the active electrodes are put in the configuration illustrated in FIGS. 10 and 11. Here only electrode 122 is activated, thus resulting in the display of its cyan face 123 to a viewer as illustrated in FIG. 11, thus resulting in the appearance of a completely cyan pixel.

Figure 13:
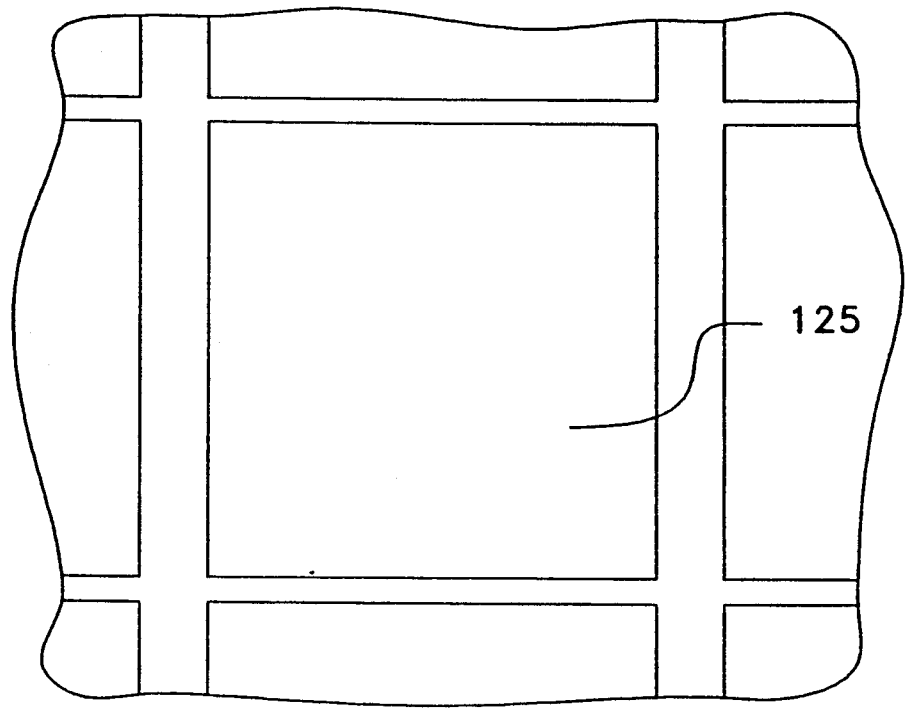
Figure 12:
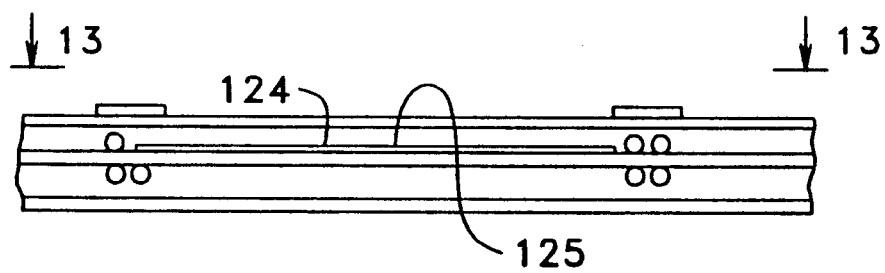

Likewise, magenta may be achieved over the complete face of the pixel with the electrodes in the configuration illustrated in FIG. 12. Here, electrode 124 is the only electrode which is activated thus resulting in the display of its magenta face 125 to the view of an individual looking at the display. It is therefore seen that the display may have either complete yellow, complete cyan or complete magenta as illustrated in FIGS. 9, 11 and 13, thus representing complete color saturation in the three primary printing colors.

Figure 15:
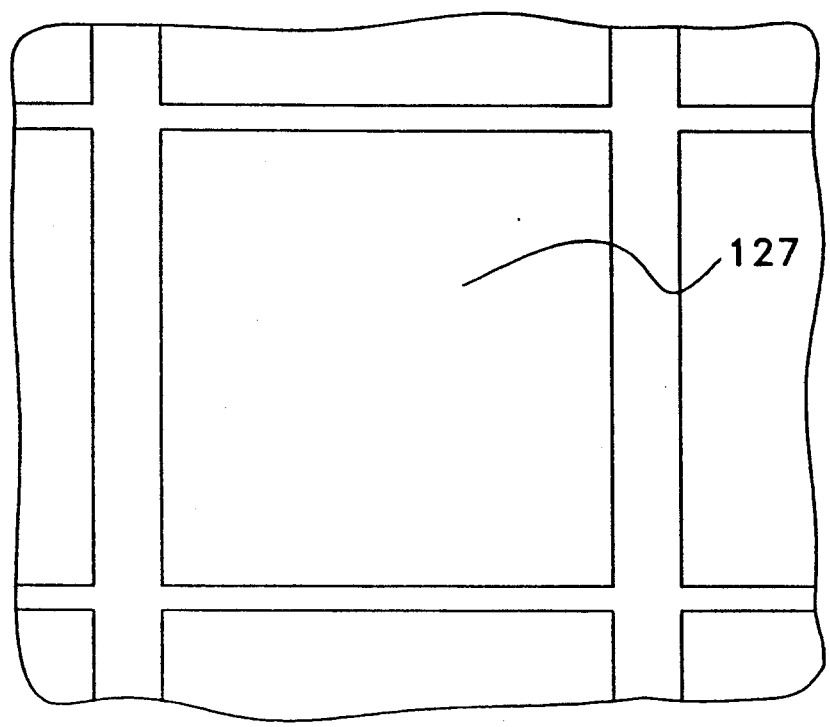
Figure 14:
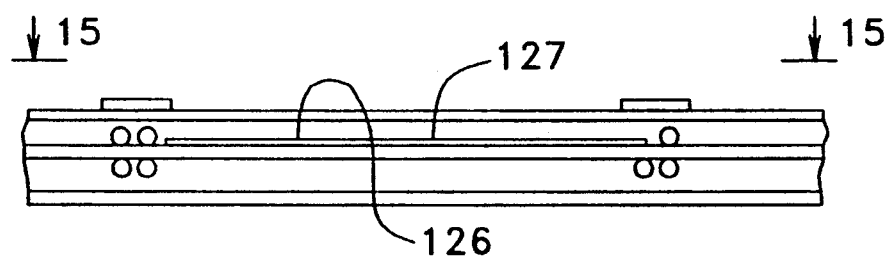
Figure 17:
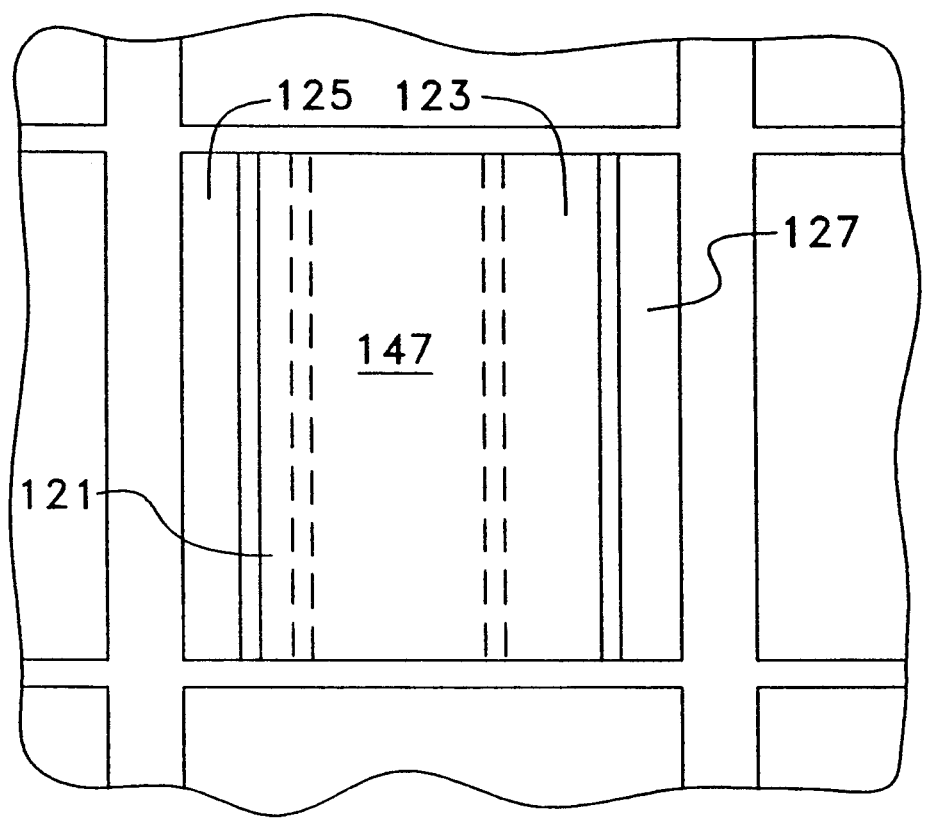
Figure 16:
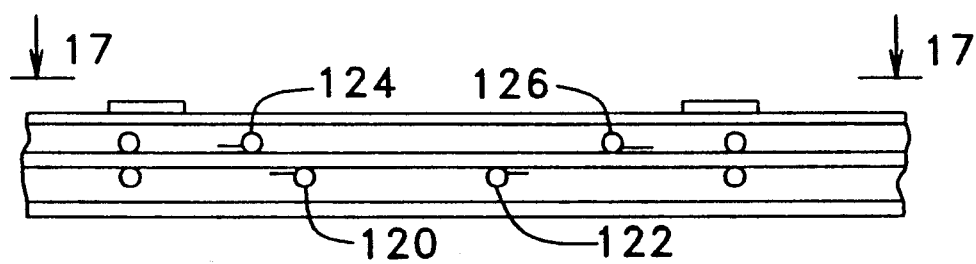

In similar fashion, as illustrated in FIG. 7, complete black can be achieved by the display, or, as illustrated in FIGS. 14 and 15, complete white. In particular, in the configuration illustrated in FIGS. 14 and 15, only electrode 126 is actuated resulting in the display of its white face 127 to the display of a viewer. Thus a surface which is substantially completely reflective may also be achieved.

In accordance with the present invention, it is also possible for any pixel to simulate any percentage of the five colors of a reflective color system. For example, by putting the electrodes in the positions illustrated in FIG. 16, it is possible to have a display which is 58% color neutral comprising a 46% lack component formed by background black color 147 and a 12% white component formed by white electrode surface 127. The remaining 42% of the display conveys all the color information including a magenta surface formed by electrode surface 125 which comprises 10% of the display, the yellow surface which comprises 8% of the display and a cyan surface which comprises 24% of the display.

Figure 19:
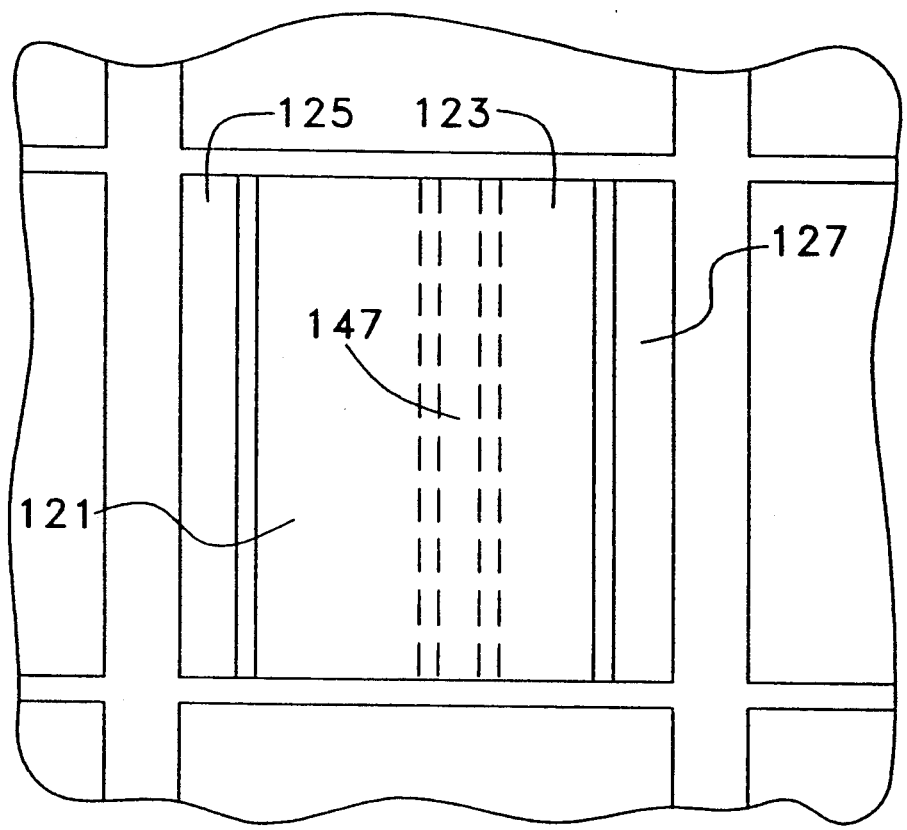
Figure 18:
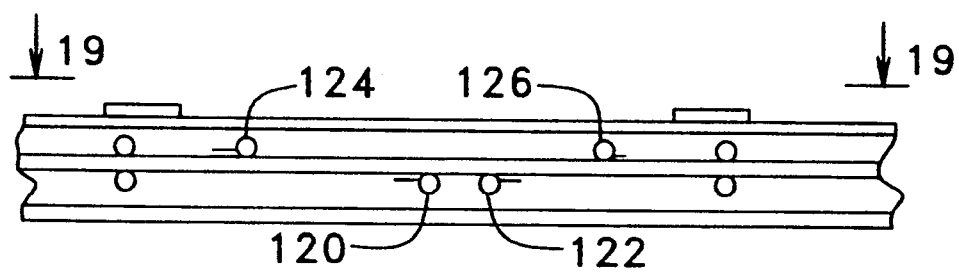

If it is desired to have yellow dominate the display, the system might take the configuration illustrated in FIGS. 18 and 19 where yellow comprises approximately 38% of the display and cyan comprises approximately 21% of it. The remaining portion of the display is comprised of magenta in the amount of 15%, black in the amount of 12% and white in the amount of 14% of the display area.

Figure 21:
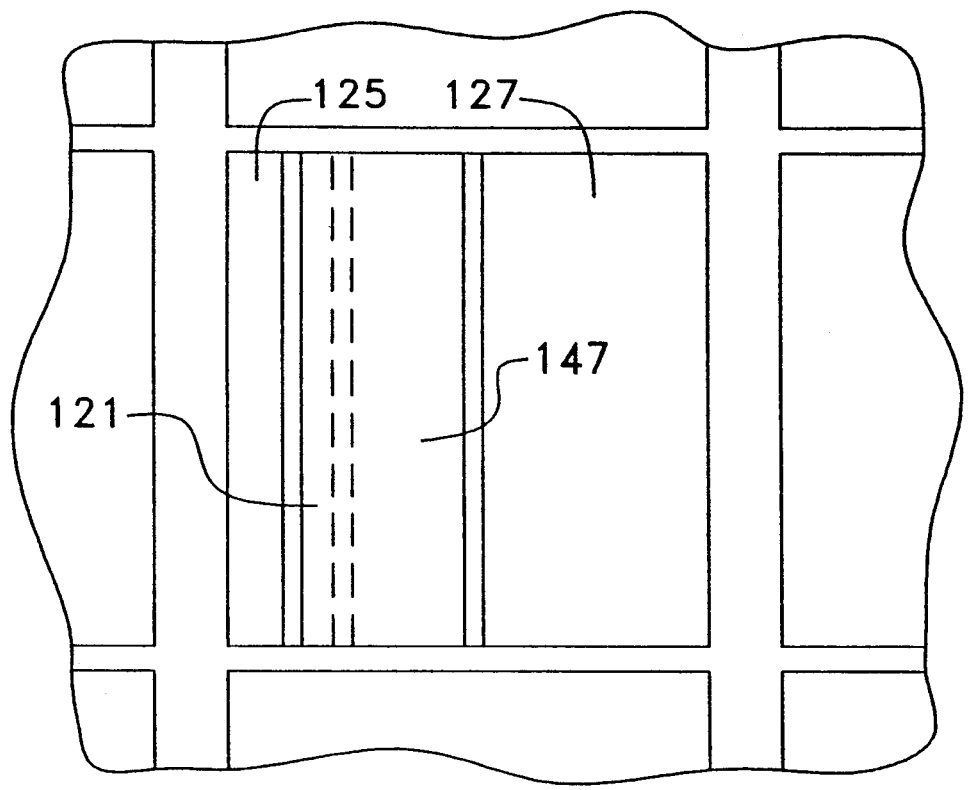
Figure 20:
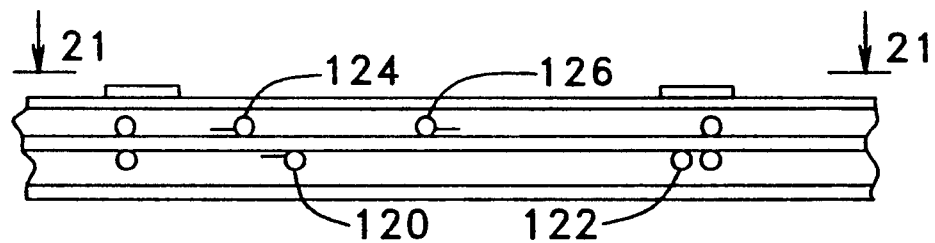

Likewise, it is possible for one of the color components to completely disappear, as is illustrated in FIGS. 20 and 21. With the electrodes in the positions illustrated in FIG. 20, the cyan color completely disappears with the display being dominated by large areas of white and black and smaller areas of magenta and yellow.

Figure 23:
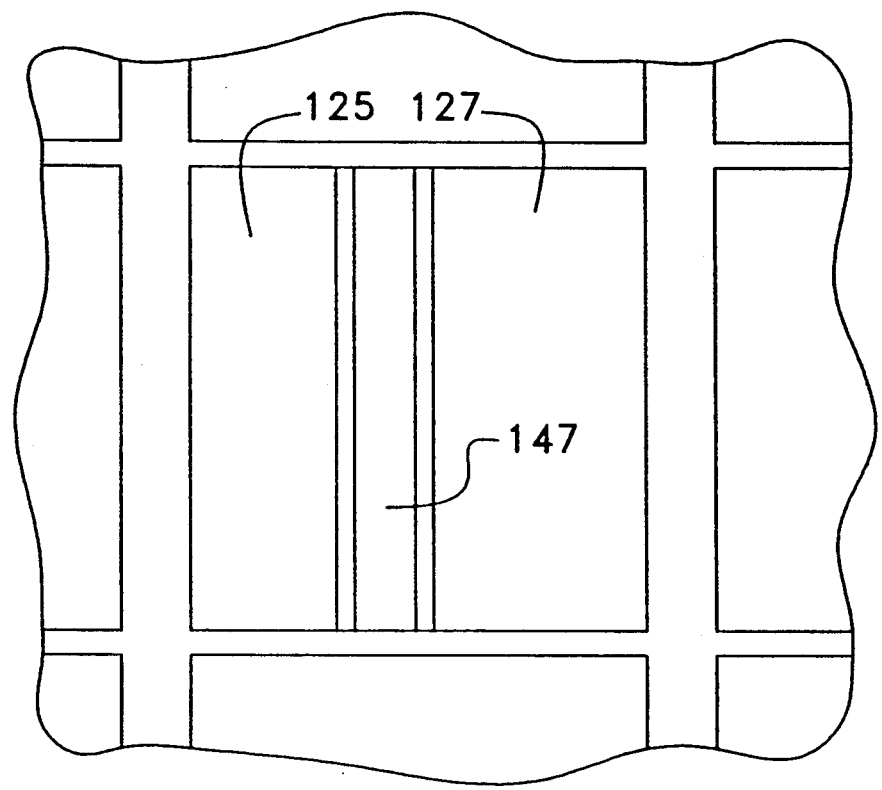
Figure 22:
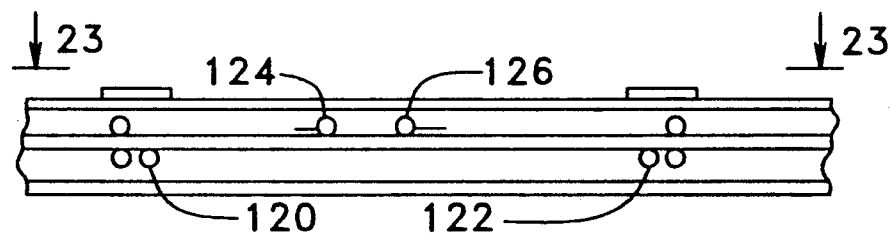

With the electrodes illustrated as shown in FIGS. 22 and 23, two of the color components have disappeared and white dominates the field which includes a small component of black and a relatively large component of magenta, thus giving the display a completely magenta color but with a large color dilution factor created by the white light reflected from surface 127. Nevertheless, the small amount of complete absorption by surface 147 prevents the pixel from reaching an undesired higher level of brilliance.

Figure 25:
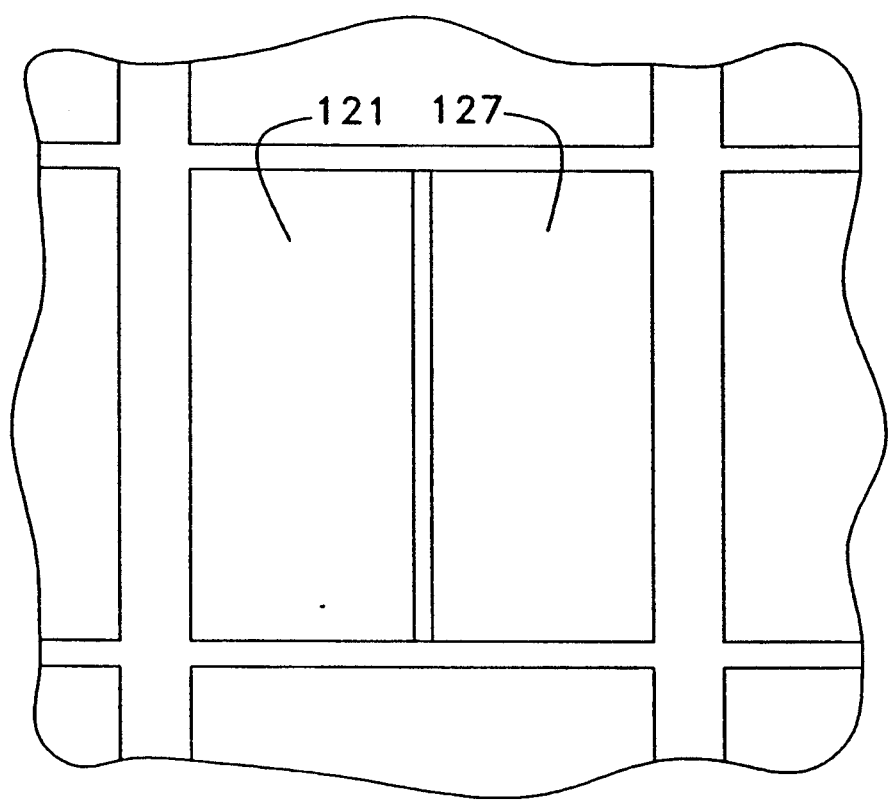
Figure 24:
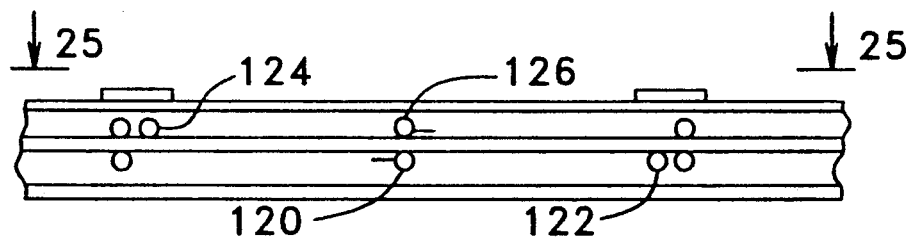

Such brilliance is achieved, however, in the purely yellow hue display illustrated in FIGS. 24 and 25. Here the display includes a yellow surface 121 which comprises approximately 55% of the display area while a white area 127 comprises approximately 45% of the display. In this respect, the yellow color of the display is pure although it is diluted to a large extent and the overall pixel made to appear more brilliant by exposure of a large portion of the white surface 127 of pixel 126.

The construction of a display 300 comprising a matrix of pixels 310 is illustrated in FIGS. 26-27. Here the active electrodes 320 and 322 are formed with a curved or pointed far edge 372. This is done for the purpose of insuring that rollout will occur at the farthest point 374 on the active electrode thus avoiding the possibility of malfunction through the rolling end of corner 376 in the diagonal direction indicated by arrow 378. The active electrodes 324 and 326 may be located underneath and opposite the electrodes 322 and 320, as illustrated by phantom lines in FIG. 26.

The embodiment of FIG. 26 also includes means for making extremely large matrix displays notwithstanding possible relatively poor conductivities in large expanses of transparent material. More particularly, in accordance with the present invention, it is contemplated that the transparent conductive material which forms the fixed electrodes of the light modulating capacitors is laid out in strips which are driven at their ends. In the event that the strips are long, the resistance of these strips will become significant over long lengths. Accordingly, underneath transparent dielectric strips 318, a layer of conductive transparent material 314 is deposited over conductive printed circuit strips 380 which may be made of copper or any other suitable material.

FIG. 30 illustrates the deposition of the transparent conductive layer for a triangular shaped electrode. Here the conductive fixed electrodes takes the form of the diamond shaped areas illustrated in FIG. 30 resulting in the formation of a matrix 400. Edge conductors 480 are also provided for the same purpose as the edge conductors in the earlier embodiment, that is, in the event that large areas are required. FIG. 31 illustrates triangular shaped electrodes 420 which as shown in FIG. 32 include metal members 436 which do not extend to the edge of the active electrode, thus resulting in a gap between the edge of the metal and the edge of the plastic portion 428 of the electrode.

In FIG. 31, all electrodes are shown in an unstressed rolled up state. In FIG. 32, one of the electrodes, namely, electrode 420a, has been unfurled illustrating its triangular shape. Electrodes are held in position by glue 483. The triangular shape makes the capacitors particularly immune to asymmetrical rolling in returning to its unstressed state.

While the corners 407 have been shown in a somewhat rounded configuration, of course the same can be made with a flat tip as illustrated in phantom lines by simply using a sufficiently narrow ribbon to form the active electrode. This will make the voltage required for complete unrolling a reasonably low value.

In accordance with yet another alternative embodiment, the edge 594 of the coiled metalized plastic strip may be chemically treated or treated with heat to form a stiff edge which will insure uniform rolling of the active electrode from both corners 576 simultaneously.

As shown in FIG. 28, the edge 594 of the active electrode is somewhat swelled due to chemical or laser action and thus provides a relatively rigid member which is lifted up substantially along its entire length. Even if the tendency of the active electrode to relax results in picking up only one of its corners, the stiff nature of edge 594 will tend to cause the entire edge to lift up extending to the opposite corner regardless of which corner, begins to rise first and eliminating any tendency to stick at the opposite corner. Thus, the active electrode will reliably and quickly reach its coiled up position illustrated in phantom lines schematically in FIG. 28.

The coloration of plastic is a relatively well-developed art and any conventional technique such as the use of dyes, surface coatings of color and binder, the incorporation of pigments into the plastic material prior to film formation, or the like may be used to achieve desired colors in the plastic portion of the active electrode.

FIG. 29 shows an arrangement of pixels and their color assignments for a full color display using a full color analog pixel of the type constructed in accordance with the invention. More particularly, in pixel 603, for example, the magenta and black electrodes are on opposite edges of the pixel and on the top of the device visible to a viewer. On the other hand, the cyan and yellow electrodes are on the opposite side of the substrate.

Insofar as the electronic bussing arrangement created by the physical configuration illustrated, for example, in FIGS. 26 and FIG. 32 necessitates that adjacent electrodes must have opposite configurations, pixel 604 has its black electrode rolling toward a rolled up position on the left on the top while the magenta electrode is on the top and rolls toward a rolled up position on the right, while on the underside of the substrate the yellow electrode rolls toward a rolled up position on the left and the cyan electrode rolls toward a rolled up position on the right. This is the opposite of pixel 603 and facilitated by the inventive structure.

As an alternate possibility, one may also wish to uniformly mix devices in which the colors that appear on the front with devices in which those colors appear on the back of an adjacent device to balance the look of the pixels, whose front colors may be more vivid. Alternatively, for example, cyan may appear as a front electrode color, a rear electrode color and a background color.

The possibility of analog control of the electrode is possible for the embodiment of FIG. 32, because of the relatively low voltage needed to begin a rollout and the relatively high voltage needed to substantially complete it. A possible arrangement of colors in an array of light modulating capacitors such as that illustrated in FIG. 32 is illustrated in FIG. 33. Here, because of the triangular configuration, each pixel is limited to three colors. In accordance with the disclosed embodiment, a black background is provided and only a pair of active electrodes, one on the front and one on the back of the substrate, are provided. The upper electrode may, for example, in the case of pixel 610a be white while the lower electrode may be yellow. Because of the symmetricity of the driving bars, adjacent pixel 610b has the same color capabilities and is driven simultaneously with the same magnitude of signal.

However, magenta and cyan are provided by the next pixel 610c which has magenta on the top and cyan on the bottom as does its adjacent pixel 610d together with which it is driven simultaneously. However, it is noted that the matrix of FIG. 33 is somewhat limited in its capacity to receive various colors.

Insofar as the background of all pixels is black, it is possible to achieve an all black display. However, only a maximum white component of 50% is achievable with this structure. Likewise, for each of the various color components, only a maximum of 50% is possible. Thus, this structure will give a display which is somewhat lacking in brilliance as compared to the matrix arrangement illustrated in FIG. 29. Nevertheless, simplified manufacturing parameters make this display quite attractive for numerous purposes.

Finally, it is noted that the inventive system is disclosed as a reflective system. Naturally, the use of a light transmissive active electrode made of color filtering plastic covered with an interrupted layer of metal introduces the possibility of a transmissive system. The same can be achieved by etching small holes in the metal layer on the active electrode.

It is contemplated that in addition to dedicated programming for signs, and the like, that the inventive system will be useful in the manufacture of large television screens which could be driven with standard television signals. Naturally, insofar as standard broadcast television and standard television signals are based around the light emitting red, blue and green primary colors, a microprocessor would be necessary to implement a translation algorithm between the emissive color information of a standard television signal and a reflective color signal necessary to drive the inventive system in its reflective embodiment.

Yet another alternative embodiment of a pixel 710 constructed in accordance with the present invention is illustrated in FIG. 34. Pixel 742 may be part of a large matrix or an individual discrete element or a part of a module of pixels configured to be a part of a larger display.

Referring to FIGS. 34 and 35, pixel 710 comprises a light modulating capacitor which is built on a substrate 712. Substrate 712 is preferably made out of thin rigid transparent plastic in order to give the device rigidity, light weight, and strength while minimizing parallax between the front and back of the device. Suitable materials for substrate 712 include Plexiglass brand plastic or Mylar brand plastic transparent sheets. Fixed electrodes 714 and 715 are made of a thin layer of conductive transparent material such a indium tin oxide. A layer of transparent insulative dielectric material 718 such as poly propylene is disposed over fixed electrodes 714 and 715 to provide insulation between the fixed electrodes and the active electrodes.

Beginning with center plate 712 which is optically clear and has reasonable mechanical strength, assembly is done outwardly in either direction. A 7 mil film of mylar coated with ITO by Southwall Technologies is bonded with the mylar side to the center piece, using pressure sensitive adhesive. A non polar dielectric is bonded to the ITO layer. The rollouts are attached to the positions according to FIG. 35. The dielectric is bonded to the ITO layer first. Then the mylar side, which is not in the circuit is applied to the center panel. Most glues are highly polar and are therefore best left out of the electrical part of the circuit. The dielectric is usually applied by means of heat and pressure in order to keep polar charge out of the circuit. The boundary lines between triangles in the fixed electrodes must be etched, with no shorts between either side. Then connection structure is applied in order to apply driving voltage to the device.

Active electrodes 720 and 722 are disposed over a dielectric insulative layer 718. Electrodes 720 and 722 are made of a pre-stressed coil of thin plastic material which has been covered prior to stressing with a layer of metal, such as aluminum layers 736 and 738, respectively. Because the aluminum layers are on the underside of the electrodes, a conductive glue 783 may be used to adhere the electrodes to the dielectric layer 718 as well as to attach a pair of conductors 737 and 739. Thus, means for driving the active electrodes is provided by conductors 737 and 739, which are connected electrically to aluminum layers 736 and 738 by conductive glue 783.

On the reverse side of substrate 712, a second pair of electrodes are disposed with an orientation 90 degrees offset from the orientation of the active electrodes 720 and 722. Thus, one of these electrodes, namely, active electrode 724 appears as a rolled up coil in the view of FIG. 35. The electrode on the underside of the device not visible in FIG. 35 is driven by fixed electrode 754, while active electrode 724 on the underside of the device is driven by fixed electrode 755. The active electrodes on the underside of the device are insulated from their respective fixed electrodes 754 and 755 by dielectric insulative layer 758.

The plastic side of electrode 720 is, in accordance with the preferred embodiment, covered with an extremely thin layer of dye, pigment or other material mixed with a binder, resulting in the display of the pigment's color. In accordance with the preferred embodiment electrode 720 may be colored cyan.

In like fashion, electrode 722 has its plastic side colored magenta. A layer of yellow paint 762 is applied to the visible face of back housing member 748. Back housing member 748 together with transparent face plate 788 maintains the active electrodes sealed and thus safe from dust, humidity and other environmental factors.

Black and white are provided by electrodes 724 and 726. Electrode 724 may be made white by having its middle layer etched using a mild acid and coated with titanium dioxide, using a suitable binder. In similar fashion, the metal surface of active electrode 726 may be made black using graphite.

A more complete picture of the fixed electrodes 714 and 715 is provided in FIG. 36 and generally, it is noted that when electrode 720 is moving in the direction of arrow 721, initially the amount of electrode 714 facing rolled up electrode 720 is large but becomes increasingly smaller as the electrode rolls out, thus requiring greater voltage to continue the roll out procedure. This provides for analog control of the rollout. It is noted that the tip 714' of electrode 714 is flat and not pointed in order to provide enough area to keep the active electrode 720 completely unrolled without excessively high voltage which would be required if the fixed electrode came to a point. Indeed, lower peak driving voltages may be obtained by making the tips of the fixed electrodes even wider.

A line of fixed electrodes may be driven through the use of a bus bar conductor which may be made of ITO or, in larger arrays, other metal deposited in the form of a bus bar 709 as illustrated in FIG. 36.

In view of the fact that opposite fixed electrodes 714 and 715 both underlie both of the active electrodes 720 and 722, in accordance with the present invention, independent operation can be obtained by driving the electrodes associated with them at different times. In the context of a matrix display, and a standard television signal in particular, one could consider the possibility of the first field of a two field frame of a standard television signal being coupled to electrode 720 while the interlaced second field of the two field frame is coupled to electrode 722.

Referring to FIG. 37, underside fixed electrodes 754 and 755 are illustrated in phantom lines thus showing their shape and orientation. It is noted that the underside electrode 754 and 755 are at a 90 degree angle to the two electrodes on the top in order to allow the underside active electrodes to move in orthogonal directions. In addition, it is noted that the asymmetrical configuration of the fixed electrodes is important. Because the electrodes are asymmetrical with respect to the center line of their respective active electrodes, the lateral forces on the active electrodes are balanced, thus improving the likelihood that the active electrodes will unfurl in a straight and flat fashion.

Referring to FIG. 38, a matrix 700 of pixels 710 is illustrated. It is noted that bus conductors 709 may be used to individually address either side of any pixel on either side of substrate 712 individually.

The full color capability of the embodiment of FIGS. 34–38 is illustrated in FIGS. 39–41. Referring in particular to FIG. 39, active electrodes 720 and 722 are unfurled at amounts sufficient to achieve the desired amount of white and black. Electrodes 724 and 726 are also advanced to the extent necessary to present their reflective colors to the viewer. Finally, the background color is shown in the remainder amount by the colored surface 762 of backplate 748. The respective positions of the electrodes are illustrated in schematic cross-sectional form in FIGS. 40 and 41.

While an illustrative embodiment of the invention has been described above, it is, of course, understood that various modifications will be apparent to those of ordinary skill in the art. Such modifications are within the spirit and scope of the invention, which is limited and defined only by the appended claims.

We claim:

1. A light modulating capacitor, comprising:

(a) a fixed conductive electrode of a first type having a first surface portion extending in a first direction and a second surface portion extending in a second direction away from said first surface portion;

(b) an active metalized conductive electrode of a second type having light-modifying characteristics and being insulated from said fixed conductive electrode, said active electrode being configured to have, in a relaxed state, a first surface portion generally configured to oppose said first surface portion of said fixed conductive electrode and to have, in an unrelaxed state from which said active electrode is returnable to said relaxed state, a second surface portion opposable to said second surface portion of said fixed conductive electrode when said active conductive electrode is in said unrelaxed state and, when said active conductive electrode is in said relaxed state, said second surface portion of said active conductive electrode being positioned away from said second surface portion of said fixed conductive electrode; and (c) support means for supporting said active conductive electrode at a position with respect to said fixed conductive electrode where application of a potential difference between said fixed conductive electrode and said active conductive electrode causes said active conductive electrode to change its configuration to bring said second surface portion of said active conductive electrode into closer proximity to said second surface portion of said fixed conductive electrode;

said second portions of said fixed conductive electrode and said active conductive electrode, in said unrelaxed state, having facing portions, said facing portions varying in dimension in said second direction to become progressively smaller in said second direction, whereby the degree to which said active conductive electrode may be displaced from its relaxed state varies in proportion to the magnitude of said potential difference, and light can be modulated by movement of said active member second portion resulting from application of said potential difference between said electrodes.

2. A light modulating capacitor as in claim 1 wherein said active conductive electrode in its relaxed state has a small exposed area and is attracted toward said fixed conductive electrode to form a planar shape having a larger exposed area.

3. A light modulating capacitor as in claim 2 wherein said fixed conductive electrode comprises a roll of thin springy planar material having a generally cylindrical configuration and said fixed conductive electrode comprises a wedge shaped conductive member, said wedge shape having a base and a tip, said base being wider than said tip and said active conductive electrode being positioned adjacent said base, whereby the application of said voltage potential causes said active conductive electrode to begin to unroll over said fixed conductive electrode and the application of a greater voltage potential causes said active conductive electrode to substantially completely unroll.

4. A light modulating capacitor as in claim 3 wherein said fixed conductive electrode comprises indium tin oxide.

5. A light modulating capacitor as in claim 3 wherein said active conductive electrode comprises a metalized plastic member said plastic being colored.

6. A light modulating capacitor as in claim 3 wherein said active conductive electrode comprises metalized plastic and color is deposited on said metalized layer.

7. A light modulating capacitor as in claim 3 wherein said wedge shape is truncated at said tip portion.

8. A light modulating capacitor as in claim 3 wherein said fixed conductive electrode is transparent and is mounted on a transparent substrate, said transparent substrate being insulative to insulate said active electrode from said fixed electrode.

9. A light modulating capacitor as in claim 8 further comprising a background color member on a side of said substrate opposite said active conductive electrode.

10. A light modulating capacitor as in claim 3 further comprising a second fixed conductive electrode, being a fixed electrode of said first type, and a second active conductive electrode, being an active electrode of said second type, said first and second fixed conductive electrodes both being positioned beneath said first and second active electrodes when said active electrodes are in a substantially fully displaced state, said first and second active electrodes having different colors.

11. A light modulating capacitor as in claim 10 further comprising third and fourth fixed conductive electrodes being fixed electrodes of said first type and third and fourth active conductive electrodes being active electrodes of said second type, said third and fourth fixed conductive electrodes and said third and fourth active conductive electrodes being positioned on the side of said substrate opposite said first and second fixed electrodes, said fixed conductive electrodes and said substrate being transparent.

12. A light modulating capacitor as in claim 11 further comprising a colored background member.

13. A light modulating capacitor as in claim 11 wherein said substrate is a thin plastic member.

14. A light modulating capacitor as in claim 3 wherein said fixed conductive electrodes are asymmetrical with respect to the center line of said active conductive electrode when said active conductive electrode is in its substantially completely displaced state.

15. A light modulating capacitor as in claim 3 wherein metalization comprises a metal layer positioned on the side of said plastic layer adjacent said fixed conductive electrode, said fixed conductive electrode being coated with an insulative material to prevent electrical connection between said fixed and said active conductive electrodes.

16. A matrix of capacitors as in claim 1, comprising active electrodes which are activatable selectively to display the colors black, white, cyan, magenta and yellow.

17. A matrix of light modulating capacitors as in claim 1 further comprising a faceplate which outlines each light modulating capacitor in black.

18. A light modulating capacitor as in claim 1 comprising a number of said active electrodes of said second type said active electrodes being positioned, configured, dimensioned and colored to allow said light modulating capacitor to selectively, substantially reflect white, or to substantially reflect black, or to be continuously variable to reflect any percentage of incident light with a continuously selectable relative proportion of primary colors and a continuously selectable degree of color saturation.

* * * * *